(12) United States Patent
Hashimoto et al.

(10) Patent No.: US 7,319,561 B2
(45) Date of Patent: Jan. 15, 2008

(54) STEREOIMAGE FORMATION APPARATUS AND STEREOIMAGE DISPLAY UNIT

(75) Inventors: Takahiro Hashimoto, Tokyo (JP); Makoto Ikeda, Tokyo (JP); Hiroyuki Nemoto, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 20 days.

(21) Appl. No.: 11/317,941

(22) Filed: Dec. 22, 2005

(65) Prior Publication Data

US 2006/0139759 A1 Jun. 29, 2006

(30) Foreign Application Priority Data

Dec. 27, 2004 (JP) ............................. 2004-377918
Oct. 26, 2005 (JP) ............................. 2005-311782

(51) Int. Cl.
*G02B 27/10* (2006.01)
(52) U.S. Cl. ........................................ 359/621; 359/619
(58) Field of Classification Search ................. 359/621
See application file for complete search history.

(56) References Cited

U.S. PATENT DOCUMENTS

| 5,615,048 A | * | 3/1997 | Davies et al. ............... 359/622 |
| 6,462,794 B1 | * | 10/2002 | Yoshikawa et al. ........... 349/95 |
| 6,693,748 B1 | * | 2/2004 | Fujimoto et al. ........... 359/621 |
| 6,710,925 B2 | * | 3/2004 | Nemoto ....................... 359/621 |
| 7,187,501 B2 | * | 3/2007 | Wakisaka .................... 359/622 |
| 2002/0176172 A1 | * | 11/2002 | Nemoto et al. ............. 359/619 |
| 2003/0095079 A1 | * | 5/2003 | Ishikawa et al. ............... 345/6 |

FOREIGN PATENT DOCUMENTS

| JP | 64-088502 | 4/1989 |
| JP | 10-062717 | 3/1998 |

\* cited by examiner

Primary Examiner—Jordan Schwartz
Assistant Examiner—James C Jones
(74) Attorney, Agent, or Firm—Marsh Fischmann & Breyfogle LLP

(57) ABSTRACT

A stereoimage formation apparatus includes two lens array plates, each of which includes microlenses having optical axes and peaks. The optical axes of the microlenses are parallel to one another. The optical axes of the microlenses in one of the lens array plates are aligned with the optical axes of the microlenses in the other lens array plate. The peaks of the microlenses in one of the lens array plates come in contact with or are located proximal to the peaks of the microlenses in the other lens array plate. The microlenses of each lens array plate each have a predetermined spherical aberration greater than a predetermined minimum spherical aberration.

17 Claims, 16 Drawing Sheets

Thichness:
Prior Art 1.69mm
Exp.2 1.66mm

STEREOIMAGE FORMATION APPARATUS AND STEREOIMAGE DISPLAY UNIT

CROSS-REFERENCE TO RELATED APPLICATIONS

This application claims priority from Japanese Patent Application No. 2004-377918 filed Dec. 27, 2004, and Japanese Patent Application No. 2005-311782 filed Oct. 26, 2005. Each of these Japanese patent applications is incorporated by reference herein in its entirety as if set forth in full.

BACKGROUND OF THE INVENTION

The present invention relates to a stereoimage formation apparatus for forming an erect and unmagnified stereoimage, and a stereoimage display unit for displaying an erect and unmagnified stereoimage.

Japanese Patent No. 3195249 describes a display unit that includes an erecting-unmagnifying optical system having two-dimensionally arranged microlenses. A liquid crystal display (LCD) is arranged at one side of the erecting-unmagnifying optical system. The erecting-unmagnifying optical system forms, at its side opposite to the side where the LCD is arranged, an erect and unmagnified stereoimage of an image that is displayed on the LCD. The erect and unmagnified stereoimage is clearer than a blurred background image that is displayed through a perforated color plate. When viewed with both eyes by the observer, the erect and unmagnified stereoimage is viewed as a floating image.

Japanese Laid-Open Patent Publication No. 64-88502 describes a conventional erecting-unmagnifying optical system used in a scanner or a copier. As shown in FIG. 1, the conventional erecting-unmagnifying optical system includes two lens array plates 103. Each of the lens array plates 103 has a plurality of microlenses 103a that are arranged in a manner that their optical axes are parallel to one another. The optical axes of the microlenses 103a of one lens array plate 103 are aligned with the optical axes of the microlenses 103a of the other lens array plate 103. The peaks of the microlenses 103a of one lens array plate 103 come in contact with the peaks of the microlenses 103a of the other lens array plate 103. The erecting-unmagnifying optical system whose microlenses 103a are each formed to have a small spherical aberration and produces a high-resolution image.

To produce a high-resolution image, the microlenses of conventional erecting-unmagnifying optical systems are each formed to have a small spherical aberration. In the conventional erecting-unmagnifying optical system, even a slight change in the distance between an object 15 (image on an LCD screen) and the microlenses 103a causes the image 15a to blur greatly. Thus, the positional relationship between the conventional erecting-unmagnifying optical system and the object 15 cannot be changed.

The display unit described in Japanese Patent No. 3195249 is disadvantageous in that moire may be generated. Moire is a regular stripe pattern, which is generated by interference between the microlenses and the pixels of the LCD, and is displayed together with the erect and unmagnified image. Moire lowers the image quality.

R. Rorner, "Display 20 (1999)" describes an apparatus for displaying an erect image with suppressed moire. This conventional apparatus displays an erect image on a lenticular sheet on which a plurality of cylindrical lenses are arranged. The cylindrical lenses arranged on the lenticular sheet are formed not in units of pixels but in units of sub-pixels to achieve high resolution. Each cylindrical lens emits monochromatic light of one of red, green, and blue. This structure suppresses color moire. However, it is difficult to manufacture a cylindrical lens having dimensions smaller than a pixel. In particular, it is extremely difficult to manufacture a mold for the above lenticular sheet.

Japanese Laid-Open Patent Publication No. 2004-1184140 describes an apparatus for displaying an erect image with suppressed moire. This erect image display apparatus includes a planar display and a screen. The planar display has a plurality of pixels, each of which includes three sub-pixels. The screen divides the image into disparity images by limiting the travel direction of light emitted from each sub-pixel. The disparity images are viewed by the observer as an erect image. To suppress moire, the screen includes screen elements that are arranged at intervals of total numbers of an integral multiple number of the pixel pitch and an integral multiple number of the sub-pixel pitch. With this structure, moire would be too small to be observed. However, this structure suppresses moire only when the planar display is separated by a predetermined distance from the screen. This structure does not permit the distance between the planar display and the screen to be changed.

SUMMARY OF THE INVENTION

It is an object of the present invention to provide a stereoimage formation apparatus that enables a stereoimage of an object to be formed even when the distance from the object changes. It is another object of the present invention to provide a stereoimage formation apparatus that enables a stereoimage of an object to be formed without causing moire even when the distance from the object changes.

One object of the present invention is a stereoimage formation apparatus including at least two lens array plates, each lens array plate including a plurality of microlenses, each having an optical axis and a peak. The optical axes of the microlenses are parallel to one another. The optical axes of the microlenses in one of the at least two lens array plates are aligned with the optical axes of the microlenses in the other one of the at least two lens array plates. The peaks of the microlenses in one of the at least two lens array plates are in contact with or located proximal to the peaks of the microlenses in the other one of the at least two lens array plates. The microlenses of each lens array plate each have a predetermined spherical aberration greater than a predetermined minimum spherical aberration.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

The terms used in the specification will be defined as follows.

The "design thickness value for reducing the spherical aberration of each microlens" is the thickness of a lens module that is designed to form an image of an object 15, which is arranged at a predetermined working distance from the lens module, as a high-resolution stereoimage 15a at a position that is distant from the lens module by the predetermined working distance in the direction opposite to the object 15.

The unit "lp/mm" stands for line pairs per millimeter, and is used to show how many pairs of black straight lines and white straight lines are present per millimeter.

A stereoimage formation apparatus according to a first embodiment of the present invention will now be described.

Figure 2:
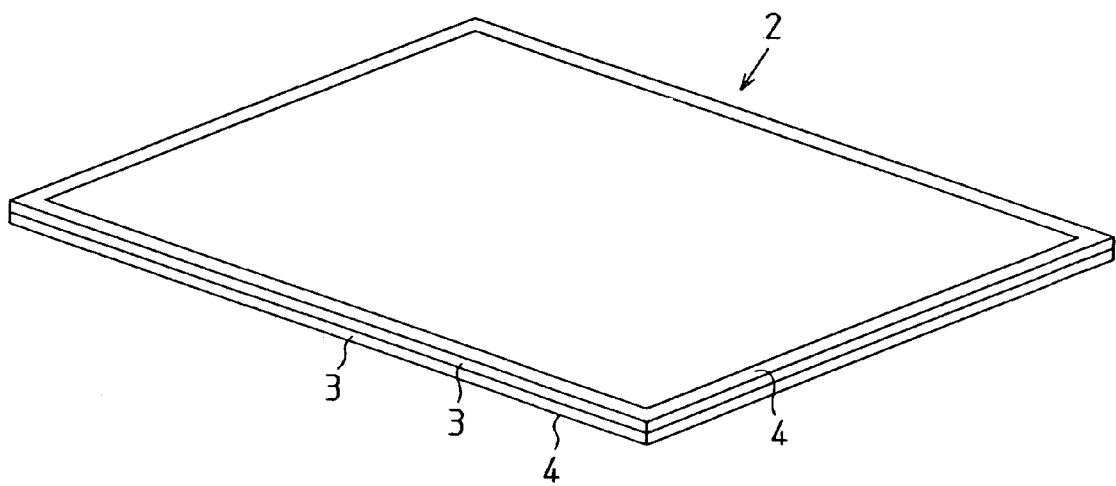
FIG. 2 is a perspective view showing an erecting-unmagnifying lens module according to a first embodiment of the present invention.
Figure 3:
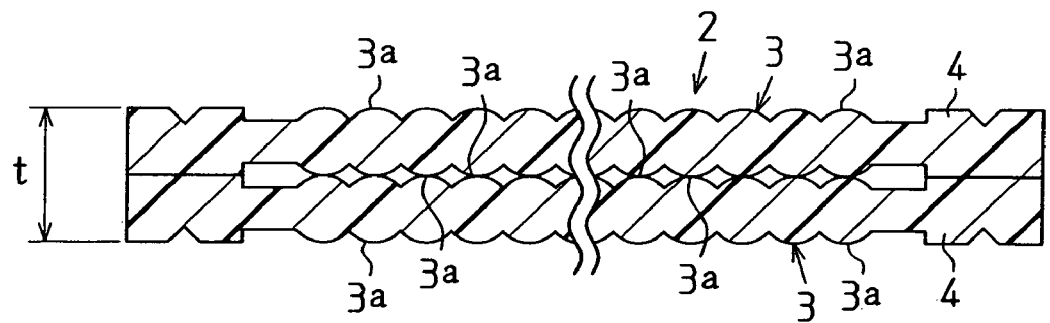
FIG. 3 is a cross-sectional view of the erecting-unmagnifying lens module of FIG. 2.

As shown in FIG. 2, an erecting-unmagnifying lens module 2, which functions as a stereoimage formation apparatus, is formed as a single rectangular thin plate. As shown in FIG. 3, the lens module 2 is formed by integrating two lens array plates 3. The two lens array plates 3 are integrated by, for example, adhering the plates 3 to each other or fixing the plates 3 to each other with a jig.

Figure 4:
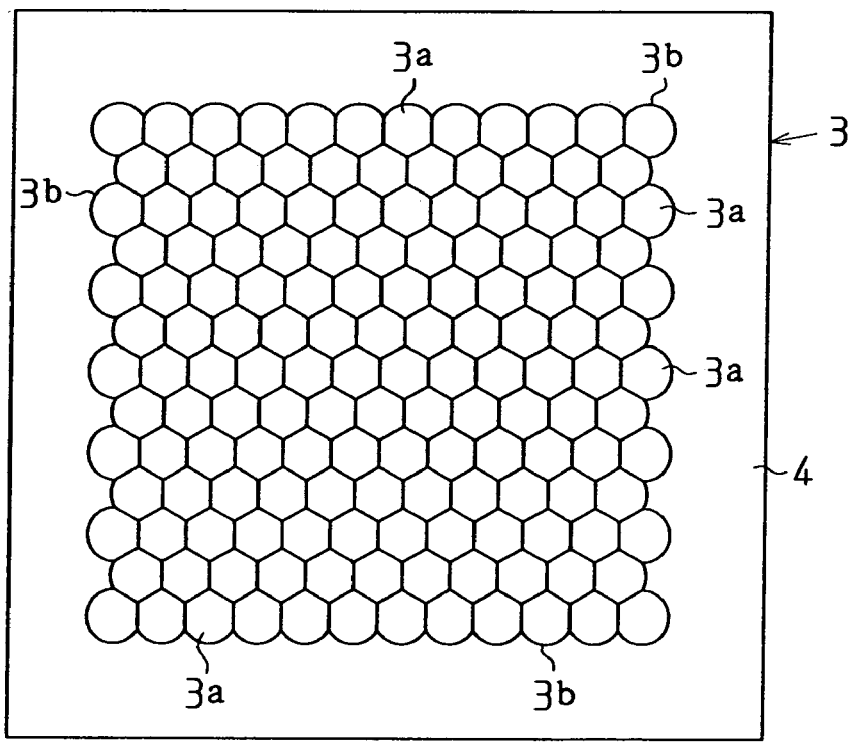
FIG. 4 is a plan view showing a lens array plate.

The two lens array plates 3 have the same structure. Each lens array plate 3 includes a substrate 4 and a plurality of microlenses 3a. The microlenses 3a are formed on the two main surfaces of the substrate 4. The microlenses 3a have spherical or non-spherical surfaces. The optical axes of the microlenses 3a formed on each lens array plate 3 are parallel to one another. The microlenses 3a are arranged two-dimensionally on each lens array plate 3. FIG. 4 shows the microlenses 3a that are in a staggered arrangement. As shown in FIG. 3, the peaks of the microlenses 3a that are formed on the inner surface of one lens array plate 3 come in contact with the peaks of the microlenses 3a that are formed on the inner surface of the other lens array plate 3.

The microlenses 3a arranged on each lens array plate 3 include outer microlenses that are close to the side edge (rim) of the lens array plate 3 and inner microlenses that are surrounded by the outer microlenses. As shown in FIG. 4, each inner microlens 3a is hexagonal. Each outer microlens 3a has a circular periphery 3b at a position close to the side edge of the lens array plate 3. The circular periphery 3b of each outer microlens 3a does not come in contact with any other microlenses 3a. The microlenses 3a are arranged in contact with one another without gaps formed therebetween.

The optical axes of the microlenses 3a of one lens array plate 3 are aligned with the optical axes of the microlenses 3a of the other lens array plate 3. The peaks of the microlenses 3a of one lens array plate 3 come in contact with the peaks of the microlenses 3a of the other lens array plate 3. The microlenses 3a of each lens array plate 3 have the same lens capability. Each microlens 3a has a desired spherical aberration. The spherical aberration of the microlens is determined by the curvature of the surface of the microlens (lens surface) or the total thickness t (refer to FIG. 3) of the two lens array plates 3 in the optical axis direction.

The total thickness t of the two lens array plates 3 is smaller than the design thickness value for reducing the spherical aberration of each microlens 3a (the thickness t1 in the prior art (refer to FIG. 1)). The microlenses 3a of the present invention are formed to have a desired spherical aberration. For example, the microlenses 3a may be formed to have a relatively large spherical aberration.

Figure 6:
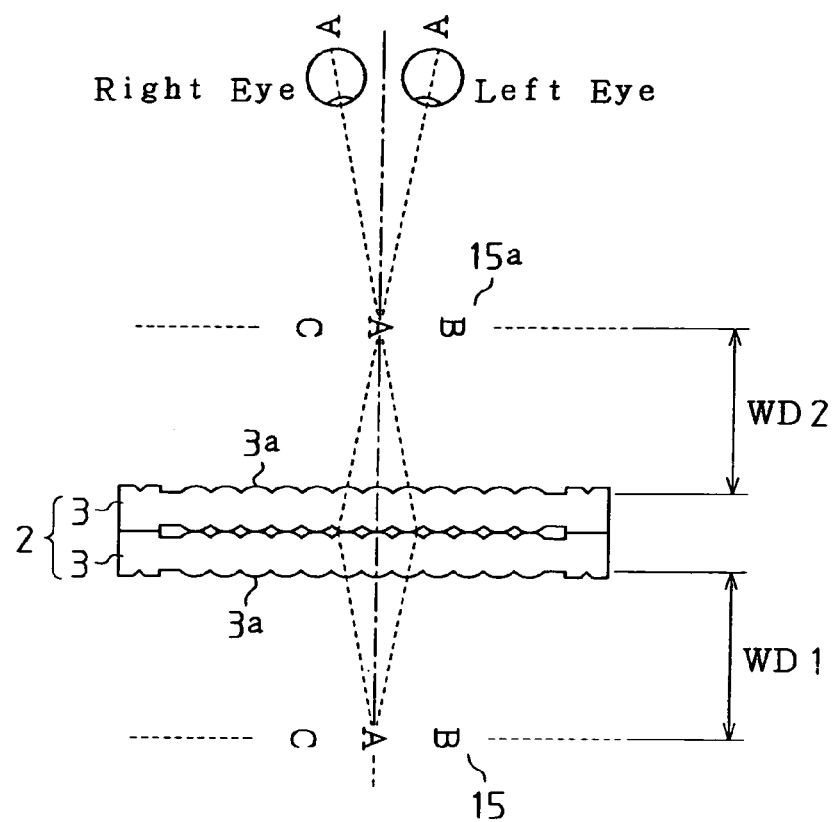
FIG. 6 is a schematic diagram showing image formation using the lens module in the first embodiment.
Figure 7:
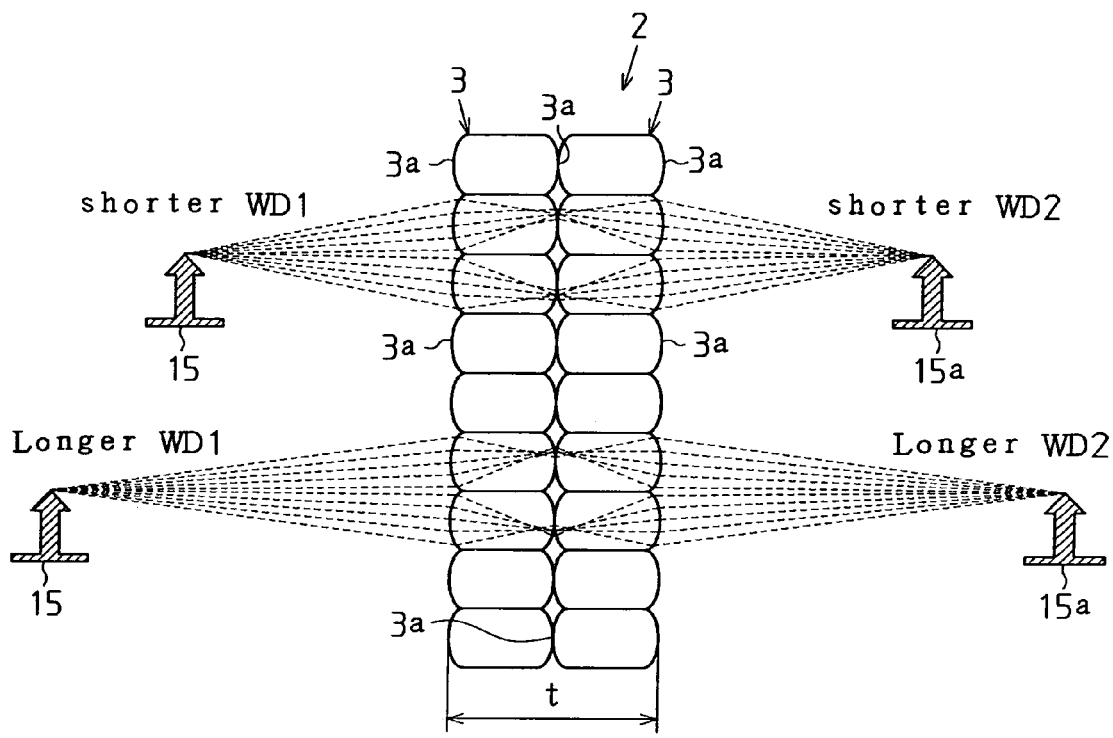
FIG. 7 shows the formation of an image that changes when front side working distance changes.

As shown in FIG. 7, the object 15 is arranged to face the lens module 2. Light rays from the object 15 pass through the lens surface of each microlens 3a. The lens module 2 forms the image 15a of the object 15 at the opposite side of the object 15. In FIG. 6, the front side (object side) working distance WD1 is the distance between the object 15 and the lens module 2, and the rear side (image side) working distance WD2 is the distance between the lens module 2 and the image 15a.

FIG. 7 shows the optical paths of the light rays in two cases when the front side working distance WD1 is short and when the front side distance WD1 is long. When the object 15 is close to the lens module 2 (when the front side working distance WD1 is short), the light rays from the object 15 are focused after traveling through relatively outer portions of the microlenses 3a, that is, after traveling through positions distant from the central lines of the microlenses 3a. When the object 15 is distant from the lens module 2 (when the front side working distance WD1 is long), the light rays from the object 15 are focused after traveling through relatively inner portions of the microlenses 3a, that is, after traveling through positions close to the central lines of the microlenses 3a. The positions at which the light rays pass through the lens surfaces of the microlenses 3a change when the front side working distance WD1 changes. In other words, the light rays from the object 15 pass at optimum positions of the lens surfaces of the microlenses 3a in accordance with the front side working distance WD1. The light rays passing at the optimum positions of the microlenses 3a are focused at a position separated by the rear side working distance WD2 to form the stereoimage 15a.

The lens module 2 is designed to form the image 15a sufficiently clear enough to be viewed without blurriness by human eyes. More specifically, the lens module 2 has the optical characteristics described below. The resolution MTF (modulation transfer function) of each lens array plate 3 at 1 lp/mm is 10% or greater and the MTF change rate is greater than 0%/mm and less than or equal to 2%/mm when the rear side working distance WD2 is in the range of 5 to 150 mm, or more preferably in the range of 5 to 100 mm. When the MTF at 1 lp/mm is greater than about 10%, the image is viewed by human eyes without blurriness. Thus, the image is viewed by human eyes without blurriness when the rear side working distance WD2 is in the above range (imaging range). It is preferable that the MTF at 1 lp/mm be 20% or greater to further increase the clarity of the image 15a.

The rear side working distance WD2 is set in the range of 5 to 150 mm because the image 15a is not viewed as a clear image when the rear side working distance WD2 is out of this range.

Each lens array plate 3 is made of a transparent resin. The lens module 2 is made of a resin.

Figure 5:
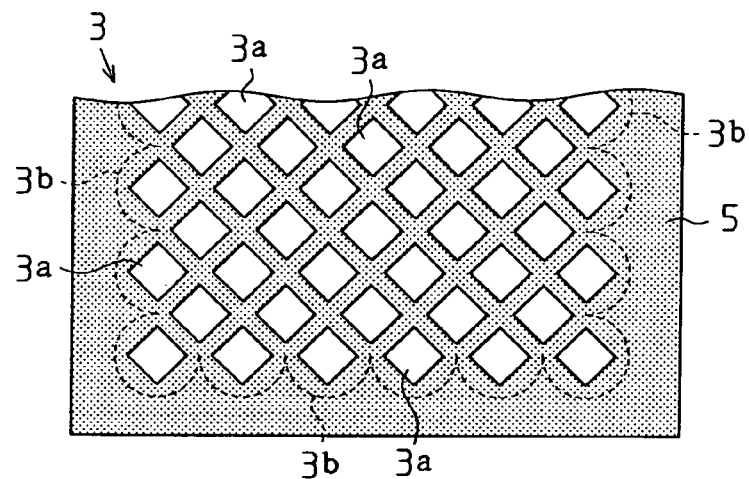
FIG. 5 is a plan view showing a light shielding film.

As shown in FIG. 5, at least one lens array plate 3 has a light shielding film 5 that is arranged to cover the circular peripheries 3b of the outer microlenses 3a.

The first embodiment has the advantages described below.

The microlenses 3a of each lens array plate 3 are formed to have the desired spherical aberration. This enables the front side working distance WD1 to be changed. For example, even when the front side working distance WD1 is changed, the lens module 2 forms the erect and unmagnified stereoimage 15a of the object 15 as an image clear enough to be viewed without blurriness by human eyes at a position separated by the rear side working distance WD2 that is the same as the front side working distance WD1 in the direction opposite to the object 15. The erect and unmagnified stereoimage may be viewed as a floating image or a sinking image by changing the front side working distance WD1. This structure permits the positional relationship between the lens module 2 and the object 15 to be changed.

The distance between the lens array plates 3 and the image 15 may be changed freely. This enables the depth dimension of a stereoimage formed by the lens module 2 to be changed.

The microlenses 3a of the two lens array plates 3 all have the same lens capability. Thus, the lens module 2 has a high capability.

The thickness t of the lens-module 2 in the optical axis direction, that is, the total thickness t of the two lens array plates 3, is smaller than the above design thickness value. This enables the microlenses 3a of each lens array plate 3 to be formed to have a relatively large spherical aberration.

The lens module 2 is formed as a rectangular thin plate. Thus, the lens module 2 can be easily handled and easily assembled into a stereoimage display apparatus.

The lens area through which the light rays from the object 15 pass is substantially uniform and the transmission amount of the light rays is substantially uniform even if the front side working distance WD1 is changed. This enables a favorable stereoimage 15a to be formed even when the front side working distance WD1 is changed.

The resolution MTF of each lens array plate 3 at 1 lp/mm is 10% or greater and the MTF change rate of the lens module 2 is greater than 0%/mm and less than or equal to 2%/mm when the rear side working distance WD2 is in a range of 5 to 150 mm, or more preferably, in a range of 5 to 100 mm. This enables the lens module 2 to form the image 15a without blurriness at a position separated by the rear side working distance WD2 that is in the above range even when the distance WD1 between the lens module 2 (lens array plates 3) and the object 15 is changed. This structure permits the positional relationship between the lens module 2 and the object 15 to be changed.

Each lens array plate 3 is a flat plate microlens array including the microlenses 3a with spherical or non-spherical surfaces that are arranged on the two main surfaces of the substrate 4. This structure enables the lens module 2 to form the image 15a without blurriness at a position separated by the rear side working distance WD2 that is in the range of 5 to 150 mm even when the distance between the lens array plates 3 that are formed by the flat plate microlens arrays and the object 15 is changed.

Each lens array plate 3, which is made of transparent resin, is formed at a low cost. Accordingly, the lens module 2 is formed at a low cost.

At least one lens array plate 3 includes the light shielding film 5 covering the circular peripheries 3b of the outer microlens 3a. This structure prevents stray light generated in the lens array plate 3 from being emitted toward the image 15a from the lens module 2. This enables the lens module 2 to form a high-contrast stereoimage.

Figure 8:
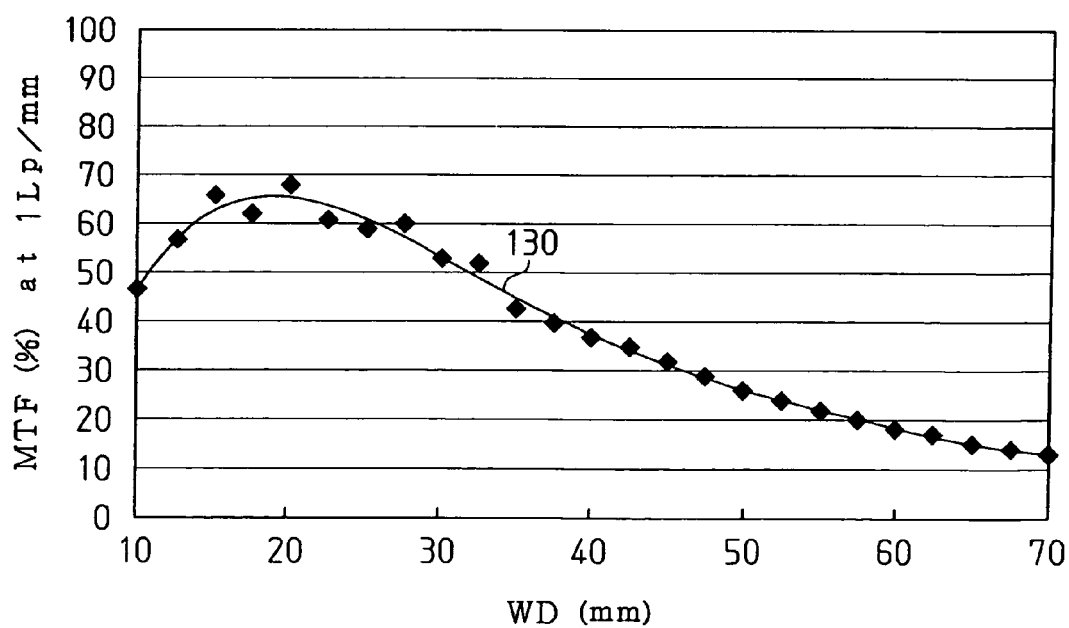
FIG. 8 is a graph showing the relationship between the rear side working distance and the resolution of an erecting-unmagnifying lens module in example 1.

A lens module 2 of example 1 will now be described with reference to FIG. 8. The curve 130 in FIG. 8 shows the relationship between the rear side working distance WD2 and the resolution MTF of the lens module 2 of example 1.

In example 1, the resolution MTF of each lens array plate 3 at 1 lp/mm is 10% or greater and the MTF change rate is greater than 0%/mm and less than or equal to 2%/mm when the rear side working distance WD2 is in the range of 10 to 70 mm. The angular aperture of each microlens 3a is 12 degrees. The curvature radius of each microlens 3a is 0.567 mm. The pitch of the microlenses 3a is 0.499 mm. The thickness of each lens array plate 3 (thickness of the substrate 4) is 1.63 mm.

Each lens array plate 3, which is made of transparent resin, was formed by injection molding using two molds. Each mold has a plurality of recesses that correspond to microlenses 3a in their arrangement, curvature, and diameter. Each lens array plate 3 was formed by injecting transparent resin between the two molds. Any transparent resin having properties (transparency, strength, etc.) suitable for the microlenses 3a may be used.

A lens module 2 of example 2 will now be described with reference to FIG. 9.

Figure 9:
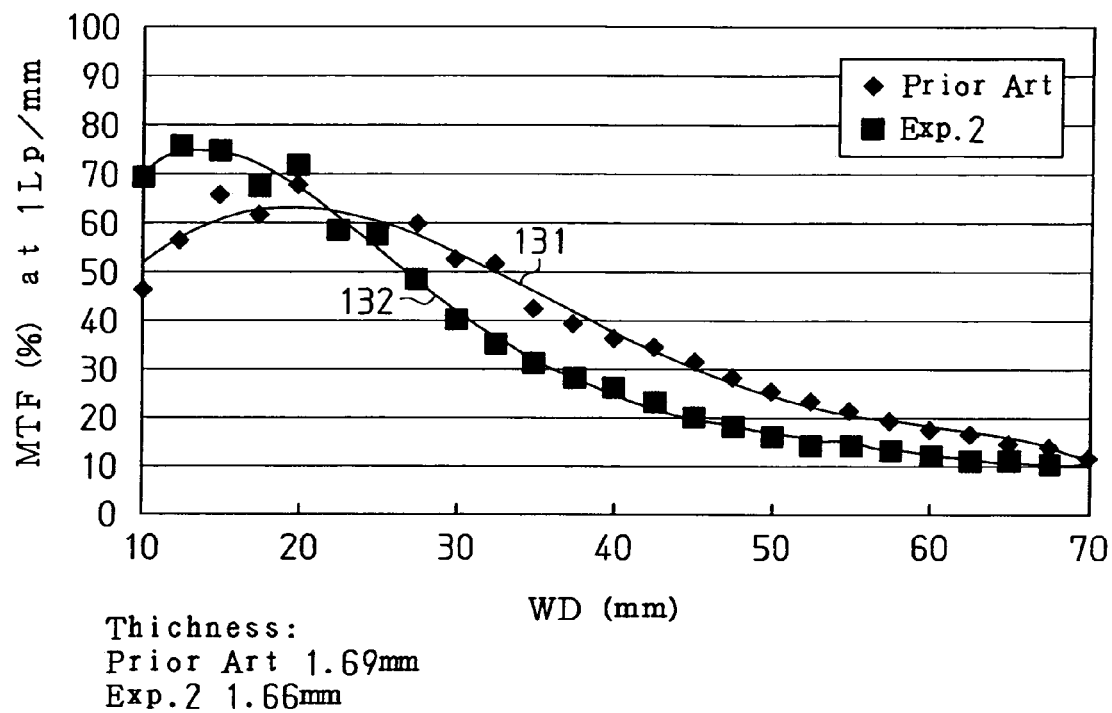
FIG. 9 is a graph showing the relationship between the thickness and the resolution of an erecting-unmagnifying lens module in the prior art and an erecting-unmagnifying lens module in example 2.

In FIG. 9, the curve 131 shows the relationship between the rear side working distance WD2 and the resolution MTF of the erecting-unmagnifying lens module of the prior art (refer to FIG. 1) used in a scanner or a copier. The erecting-unmagnifying lens module of the prior art example has a plurality of microlenses that are each designed to have small spherical aberration. The thickness t1 of the lens module, that is, the total thickness of the two lens array plates 103, was 1.69 mm.

In FIG. 9, the curve 132 shows the relationship between the rear side working distance WD2 and the resolution MTF of the lens module 2 of example 2. The thickness t of the lens module 2 (refer to FIGS. 3 and 7) was 1.66 mm. The lens module 2 of example 2 was thinner than the lens module of the prior art example by 30 μm.

As apparent from the curves 131 and 132 in FIG. 9, the lens module 2 of example 2 has lower resolution and forms an image less likely to be viewed as blurry in the range in which the lens module 2 may be moved, that is, in the range in which the rear side working distance WD2 may be changed (25 to 70 mm). In other words, the lens module 2 of example 2 is designed to form an image with a relatively low resolution even when the front side working distance WD1 is short. Thus, blurriness of an image caused when the front side working distance WD1 changes is less noticeable.

As compared with the lens module of the prior art, the lens module 2 of example 2 forms an image that is greatly blurred when the distance WD (rear side working distance WD2) is long. However, with the inclination of the curve 131 (MTF/WD) being small, blurriness of an image caused when the distance WD is changed is less noticeable.

Lens modules 2 of examples 3 and 4 will now be described with reference to FIG. 10. Curves 133 and 134 show the relationship between the rear side working distance WD2 and the resolution MTF of the lens modules 2 of examples 3 and 4.

For the lens module 2 of example 3, the resolution MTF of each lens array plate 3 at 1 lp/mm is 10% or greater and the MTF change rate is greater than 0%/mm and less than or equal to 2%/mm when the rear side working distance WD2 is in the range of 10 to 160 mm.

For the lens module 2 of example 3, the curvature radius of each microlens 3a was 0.576 mm, the thickness of the lens module 2, that is, the total thickness t of the two lens array plates 3, was 1.68 mm, the pitch of the microlenses 3a is 0.499 mm, and the radius of each microlens 3a was 0.3 mm.

For the lens module 2 of example 4, the resolution MTF of each lens array plate 3 at 1 lp/mm was 10% or greater and the MTF change rate was greater than 0%/mm and less than or equal to 2%/mm when the rear side working distance WD2 was in the range of 10 to 90 mm.

For the lens module 2 of example 4, the curvature radius of each microlens 3a was 0.582 mm, the thickness of the lens module 2, that is, the total thickness t of the two lens array plates 3, was 1.68 mm, the pitch of the microlenses 3a was 0.499 mm, and the radius of each microlens 3a was 0.3 mm.

Figure 10:
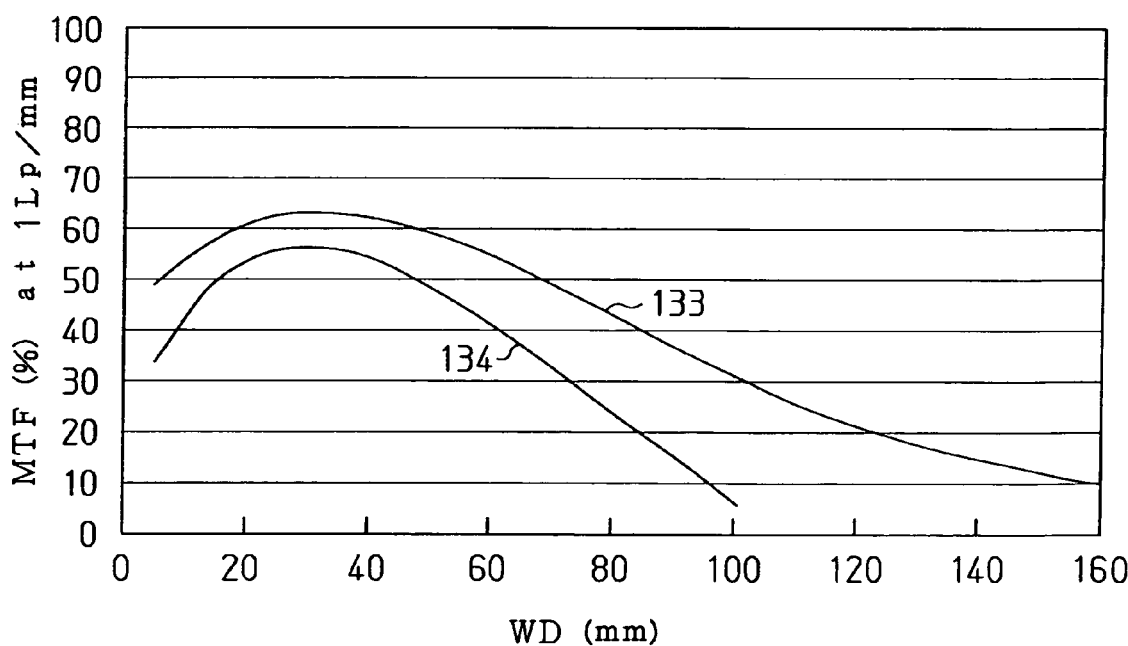
FIG. 10 is a graph showing the relationship between the rear side working distance and the resolution of erecting-unmagnifying lens modules in examples 3 and 4.

As apparent from the curve 133 in FIG. 10, the lens module 2 of example 3 has a resolution MTF of 10% or greater at 1 lp/mm and the resolution MTF changes moderately when the rear side working distance WD2 is in the range of 10 to 160 mm. As apparent from the curve 134 in FIG. 10, the lens module 2 of example 4 has a resolution MTF of 10% or greater at 1 lp/mm and the resolution MTF changes more radically than in example 3 when the rear side working distance WD2 is in the range of 10 to 90 mm. The lens module 2 of example 3 is more favorable than the lens module 2 of example 4.

Figure 11:
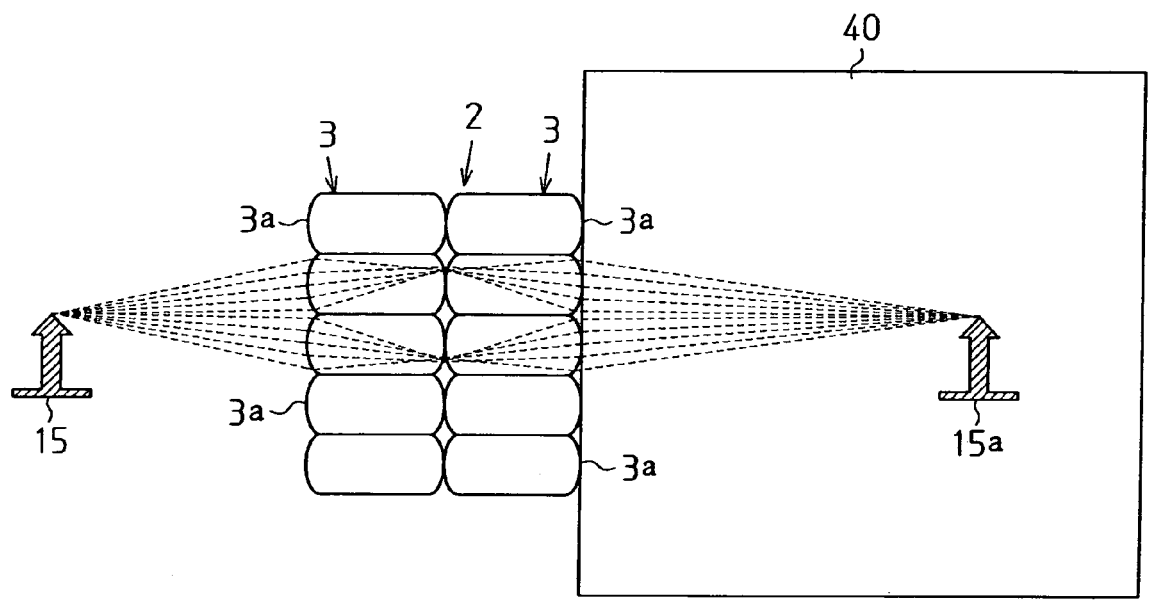
FIG. 11 is a schematic diagram of a stereoimage display apparatus using the erecting-unmagnifying lens module of the first embodiment.

FIG. 11 shows one example of a stereoimage display apparatus using the lens module 2 of the first embodiment. The stereoimage display apparatus includes a chamber for accommodating a homogeneous medium 40 and the lens module 2. The homogeneous medium 40 is transparent. The lens module 2 forms the image 15a of the object 15 in the medium 40. The image formation distance (rear side working distance WD2) is lengthened according to the refractive index of the medium 40. The medium 40 may be a gas such as air, a liquid such as water, or a solid such as transparent resin. The image formation distance is changed according to the refractive index of the medium 40. For example, when the medium 40 is water, the image formation distance is 1.5 times longer than the image formation distance when the medium 40 is air. When the medium 40 is water, the freedom of design for the positions of the object 15, the microlenses 3a, and the image 15a is greater.

Figure 12:
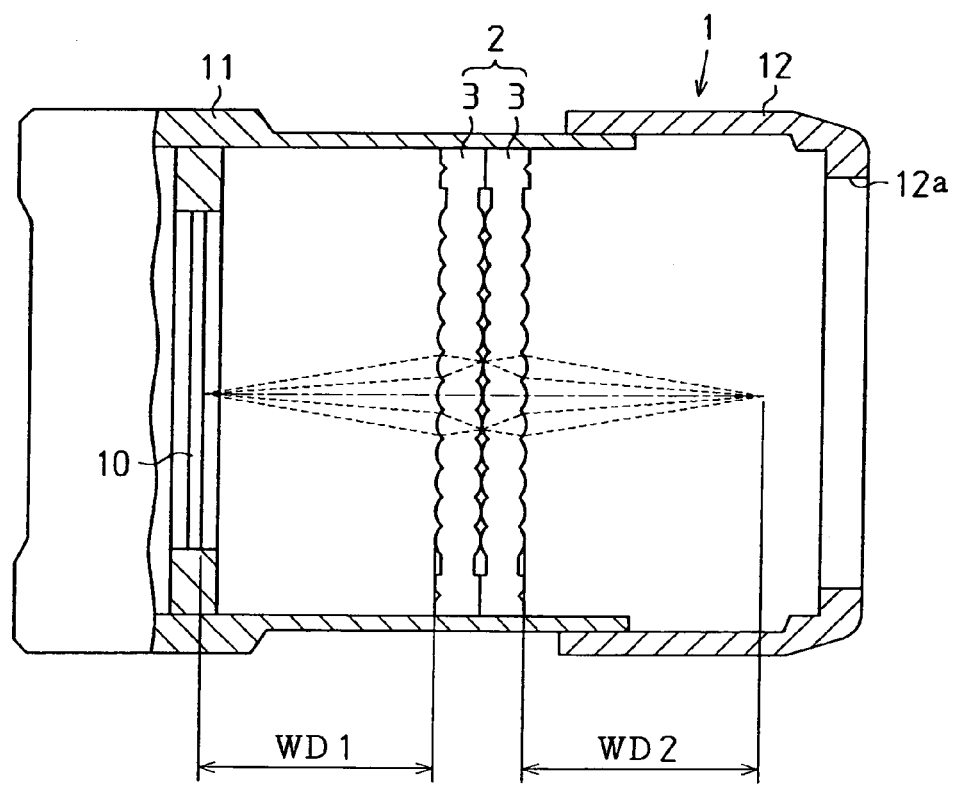
FIG. 12 is a cross-sectional view of the stereoimage display apparatus using the erecting-unmagnifying lens module of the first embodiment.

The stereoimage display apparatus 1 using the lens module 2 will now be described with reference to FIG. 12. The stereoimage display apparatus 1 is used, for example, as a display unit for a car navigation system, a display unit for a cellular phone, an advertising medium, or an amusement or entertainment device.

The display apparatus 1 includes the lens module 2, a display device 10 functioning as a display subject object, a basal end housing 11, and a distal end housing 12. The basal end housing 11 and the distal end housing 12 accommodate the lens module 2 and the display device 10. The display device 10 may be, for example, an LCD (liquid crystal display). The display device 10 displays an image 15 on its display screen by sequentially providing image signals to a plurality of pixels arranged in a matrix via the corresponding switching elements. As shown in FIG. 6, the lens module 2 forms a stereoimage 15a of the image 15 of the display device 10 in space within the distal end housing 12.

The distal end housing 12 is supported on the basal end housing 11 in a manner movable in the optical axis direction. The distal end housing 12 has a window 12a. The stereoimage 15a formed by the lens module 2 is viewable through the window 12a from outside the housing 12. For example, a transparent glass plate is fitted in the window 12a.

The two lens array plates 3 are supported on the inner surface of the basal end housing 11 in a manner movable in the optical axis direction of the microlenses 3a.

The display apparatus 1 has the advantages described below.

The resolution MTF of each lens array plate 3 at 1 lp/mm is 10% or greater and the MTF change rate is greater than 0%/mm and less than or equal to 2%/mm when the rear side working distance WD2 is in the range of 5 to 150 m. The display apparatus 1 forms the image 15a without blurriness at a position separated by the rear side working distance WD2 that is in the range of 5 to 150 mm even when the distance between the lens array plates 3 and the display device 10 (object 15) is changed. This structure permits the distance between the lens array plates 3 and the image 15a to be changed.

The distance between the lens array plates 3 and the image 15a may be changed in order to change the thickness of the stereoimage. For example, when the lens array plates 3 are moved away from the display device 10, the image 15a formed in the distal end housing 12 is viewed as a floating image by the observer.

The distance between the lens array plates 3 and the display device 10 may be changed by moving both or one of the display device 10 and the lens array plates 3.

The display apparatus 1 forms the stereoimage without blurriness at a position that is separated by the rear side working distance, which is in the range of 5 to 15 mm, even when the distance between the lens array plates 3 and the display device 10 (object 15) is changed.

The lens array plates 3 are made of a transparent resin that is available at a low cost. Accordingly, the lens array plates 3 are formed at a low cost.

The display apparatus 1 forms the stereoimage without blurriness even when the distance (front side working distance WD1) between the lens module 2 and the display device 10 is changed. Thus, the display apparatus 1 may change the depth dimension of the stereoimage by changing the distance between the lens module 2 and the image.

The display apparatus 1 displays a stereoimage in accordance with image signals provided to the display device 10.

Figure 13:
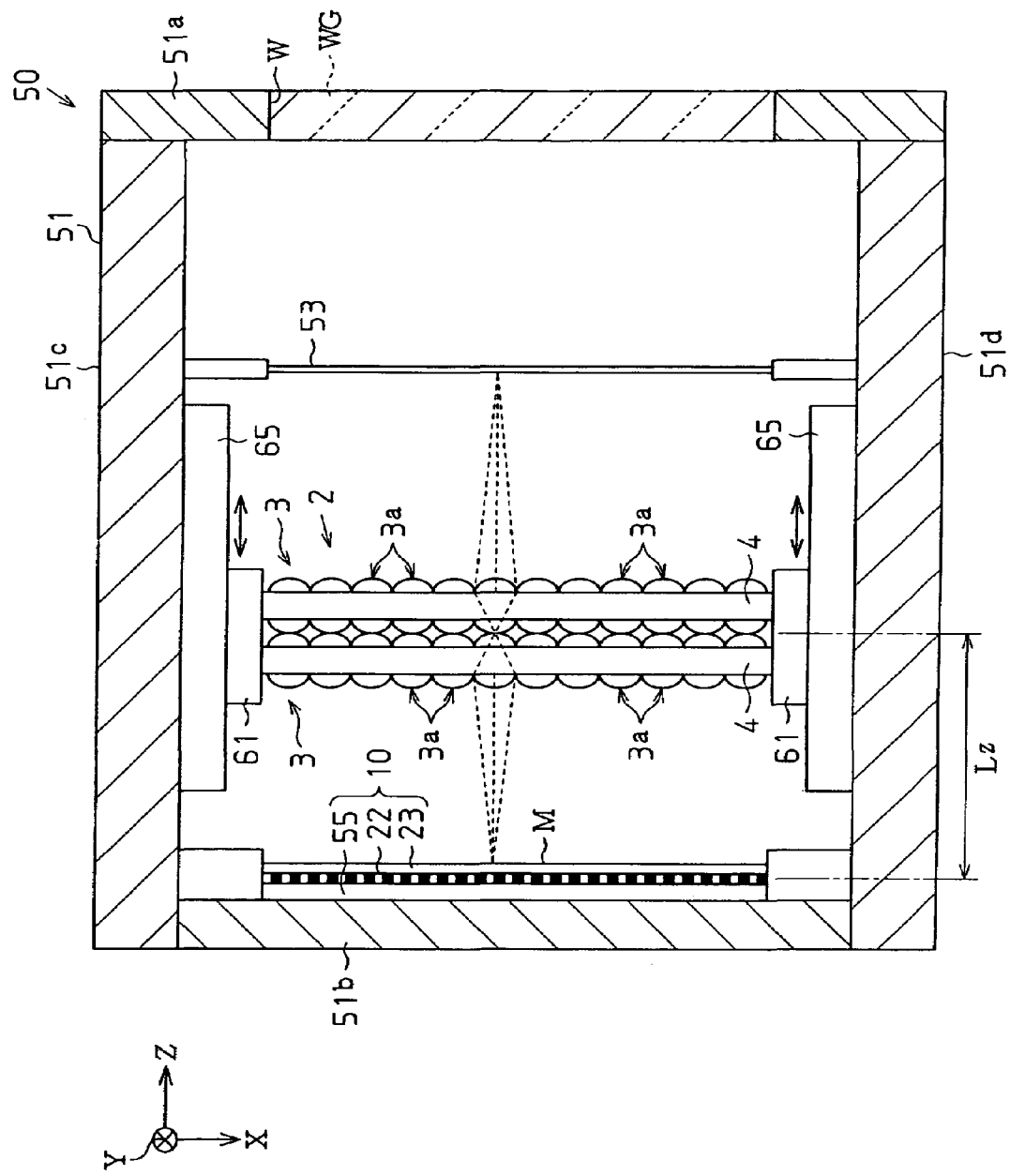
FIG. 13 is a cross-sectional view of a stereoimage formation apparatus according to a second embodiment of the present invention.

A stereoimage formation apparatus 50 according to a second embodiment of the present invention will now be described. As shown in FIG. 13, the stereoimage formation apparatus 50 includes a case 51 that is substantially box-shaped. The case 51 includes a front wall 51a having a window W. A transparent glass WG is arranged in the window W. The case 51 accommodates a display device 10, a glass plate 53, and an erecting-unmagnifying lens module 2.

The display device 10 is fixed to a rear wall 51b of the case 51. The display device 10 may be, for example, a known full color LCD. The display device 10 includes a display panel 22, a color filter 23, and a backlight 55.

Figure 14:
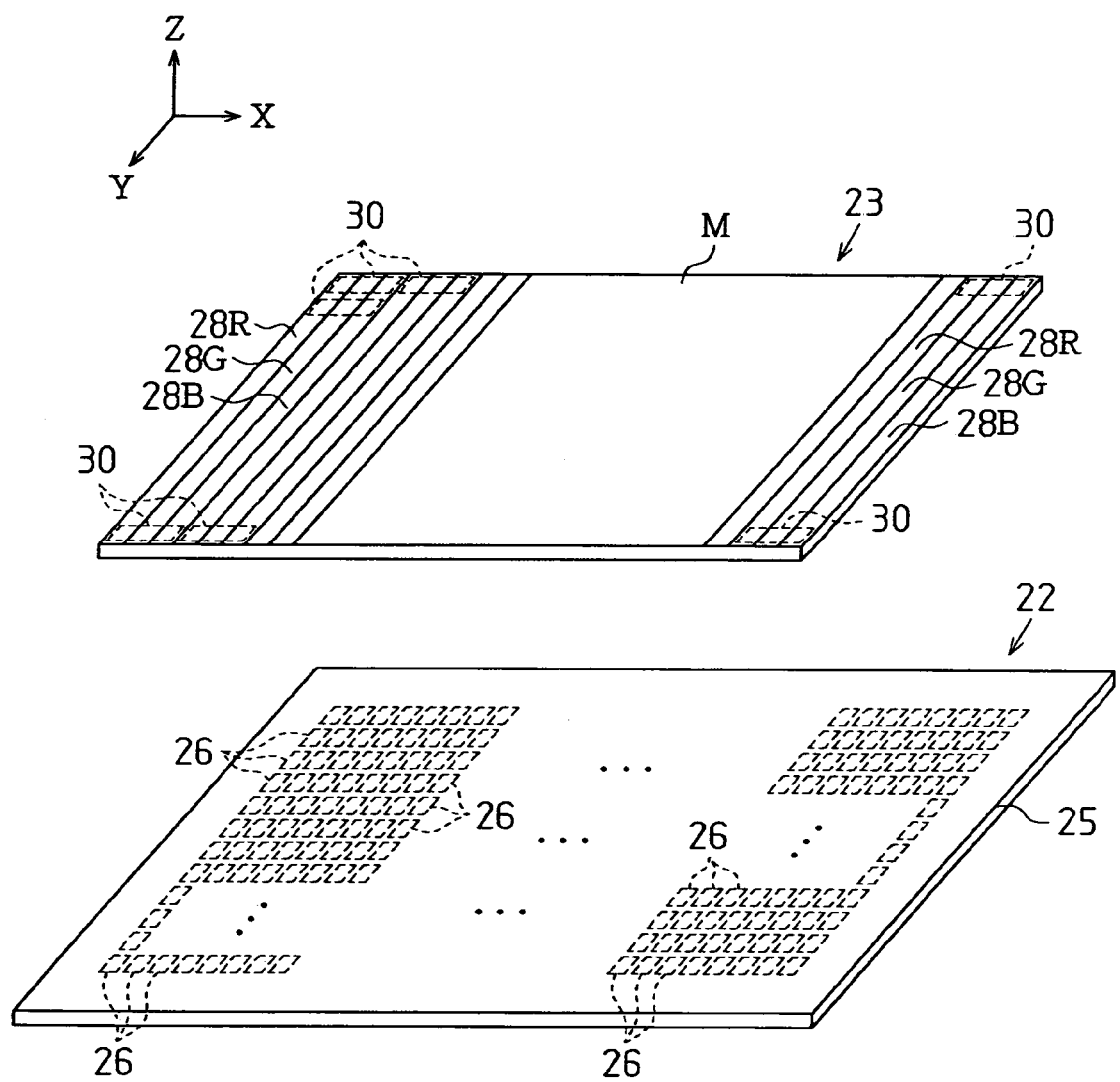
FIG. 14 is an exploded perspective view showing the display of FIG. 13.

As shown in FIG. 14, the display panel 22 includes a substrate 25 that transmits light (e.g., a glass substrate). A plurality of sub-pixel areas 26 are arranged uniformly at fixed intervals (in a matrix) on the glass substrate 25.

Each sub-pixel area 26 includes a pixel electrode and various electronic elements that are not shown in the figure. The pixel electrode in each sub-pixel area 26 is provided with a data signal from an external device (not shown). Common electrodes are formed on the glass substrate 25. Liquid crystals are arranged between the common electrodes and the pixel electrodes of the sub-pixel areas 26.

When a pixel electrode in one sub-pixel area 26 is provided with a data signal, a potential difference according to the data signal is generated between the pixel electrode and the common electrode. The potential difference controls the orientation of the liquid crystal arranged in the sub-pixel area.

Figure 15:
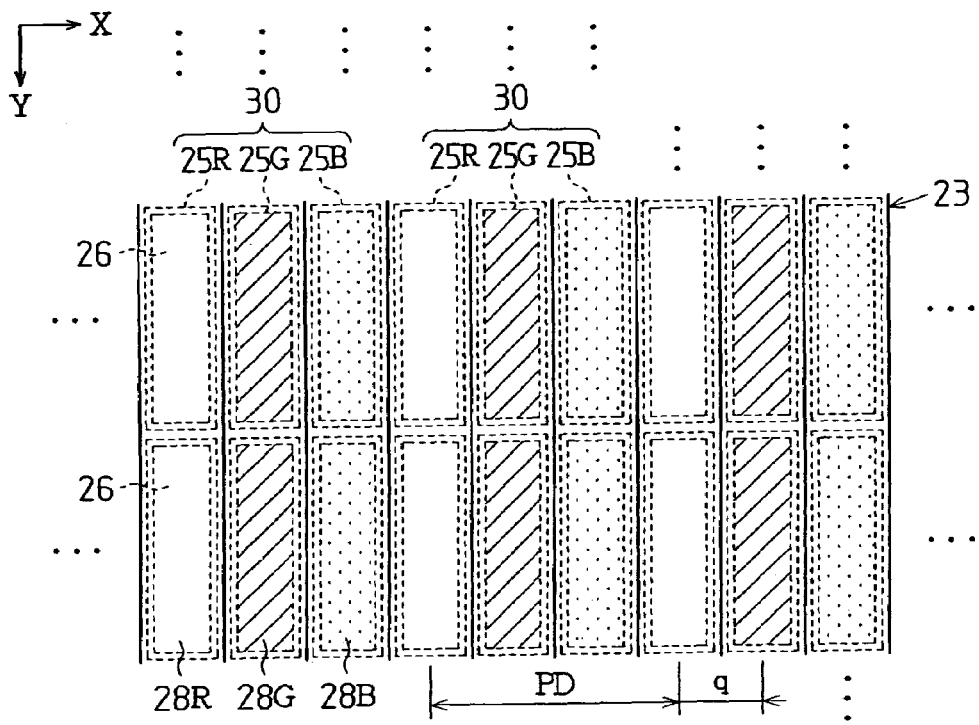
FIG. 15 is an enlarged top view showing the display of FIG. 14.

As shown in FIG. 14, the color filter 23 includes red conversion layers 28R, green conversion layers 28G, and blue conversion layers 28B. Each sub-pixel area 26 faces one of the conversion layers 28R, 29G, and 28B. As shown in FIG. 15, the conversion layers 28R, 28G, and 28B are arranged in the X-axis direction in the order of a red conversion layer 28R, a green conversion layer 28G, a blue conversion layer 28B, a red conversion layer 28R, a green conversion layer 28G, etc. The conversion layers 28R, 28G, and 28B extend in the Y-axis direction.

As shown in FIG. 15, three sub-pixel areas 26 and the opposing three color conversion layers 28R, 28G, and 28B form three sub-pixels 25R, 25G, and 25B, respectively. The sub-pixels 25R, 25G, and 25B correspond to the three colors of red, green, and blue, respectively. The sub-pixels 25R, 25G, and 25B of the three colors that are adjacent in the X-axis direction form one pixel 30.

The sub-pixels 25R, 25G, and 25B are arranged with a fixed pitch q in X-axis direction. The pixels 30 are arranged with a fixed pitch PD in the X-axis direction. The sub-pixels 25R, 25G, and 25B of the same colors are arranged in lines in the Y-axis direction so that each line is formed by sub-pixels of the same color. The color filter 23 has vertical stripes that are formed by the lines of the sub-pixels 25R, 25G, and 25B of the same colors.

As shown in FIG. 13, the backlight 55 emits light having wavelengths of a predetermined range toward the display panel 22. The light of the backlight 55 passes through the liquid crystals in the sub-pixel areas 26 formed on the display panel 22. As a result, a desired image is formed on a surface of the color filter 23, or on an image display screen M.

The glass plate 53 is fixed to an upper wall 51c and a lower wall 51d of the case 51 so as to face the display device 10. The glass plate 53 is substantially square. The glass plate 53 is arranged between the erecting-unmagnifying lens module 2 and the display device 10.

Figure 16:
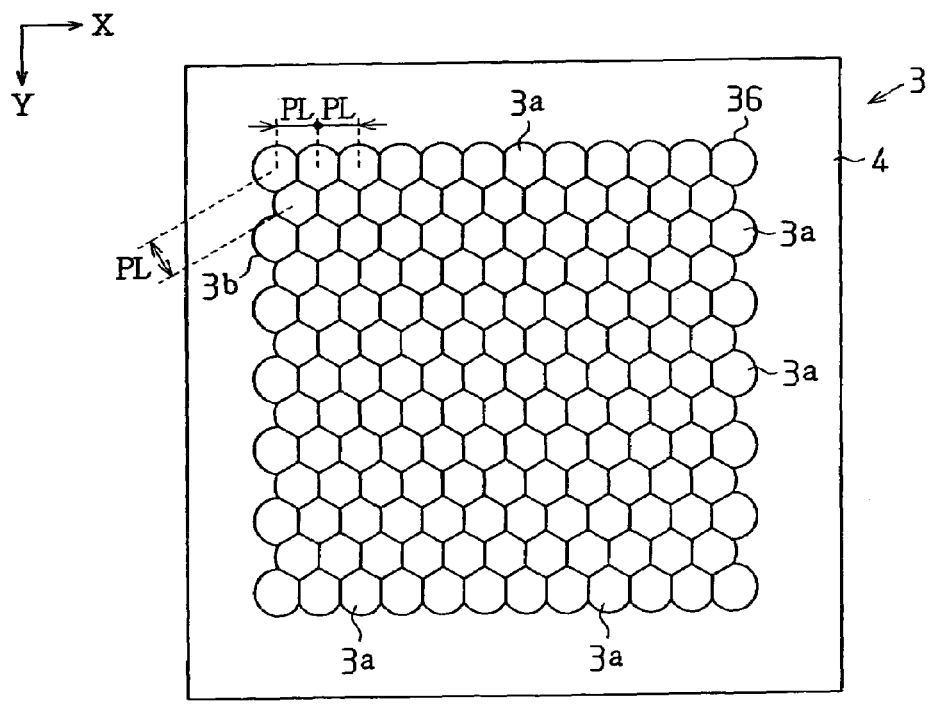
FIG. 16 is a top view showing the lens array plate of FIG. 14.
Figure 17:
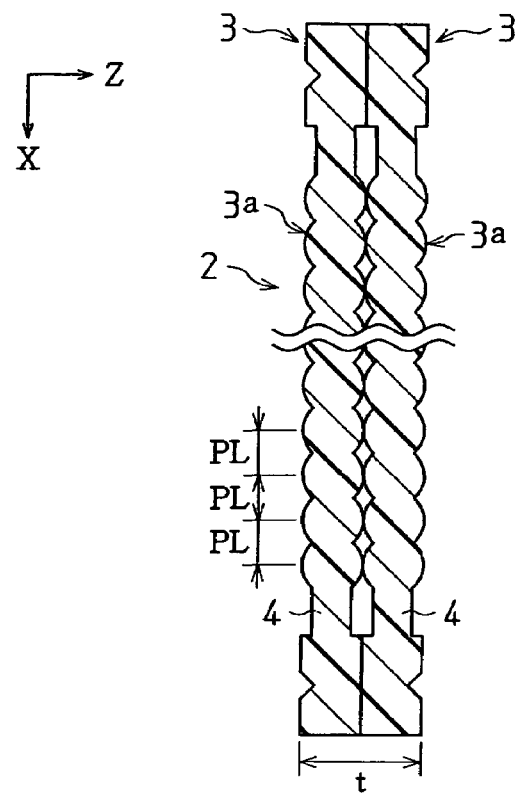
FIG. 17 is a cross-sectional view of the lens array plate shown in FIG. 13.

The erecting-unmagnifying lens module 2 forms an erect and unmagnified image of an object. As shown in FIG. 13, the erecting-unmagnifying module 2 is formed by integrating two lens array plates 3. The two lens array plates 3 have the same structure. As shown in FIGS. 16 and 17, each lens array plate 3 includes a substrate 4 and a plurality of microlenses 3a. The microlenses 3a have spherical or semi-spherical surfaces, and are arranged uniformly at fixed intervals on the two main surfaces of the substrate 4. The microlenses 3a have the same shapes as those in the first embodiment.

The optical axes of the microlenses 3a are parallel to one another. As shown in FIG. 17, the two lens array plates 3 are integrated so that the peaks of the opposing microlenses 3a come in contact with each other. The microlenses 3a are arranged with a fixed pitch PL. The two lens array plates 3 have a thickness t in the optical axis direction. Each lens array plate 3 is made of a transparent resin.

The erecting-unmagnifying lens module 2 and the display device 10 that are combined together will now be described with reference to FIG. 18.

Figure 18:
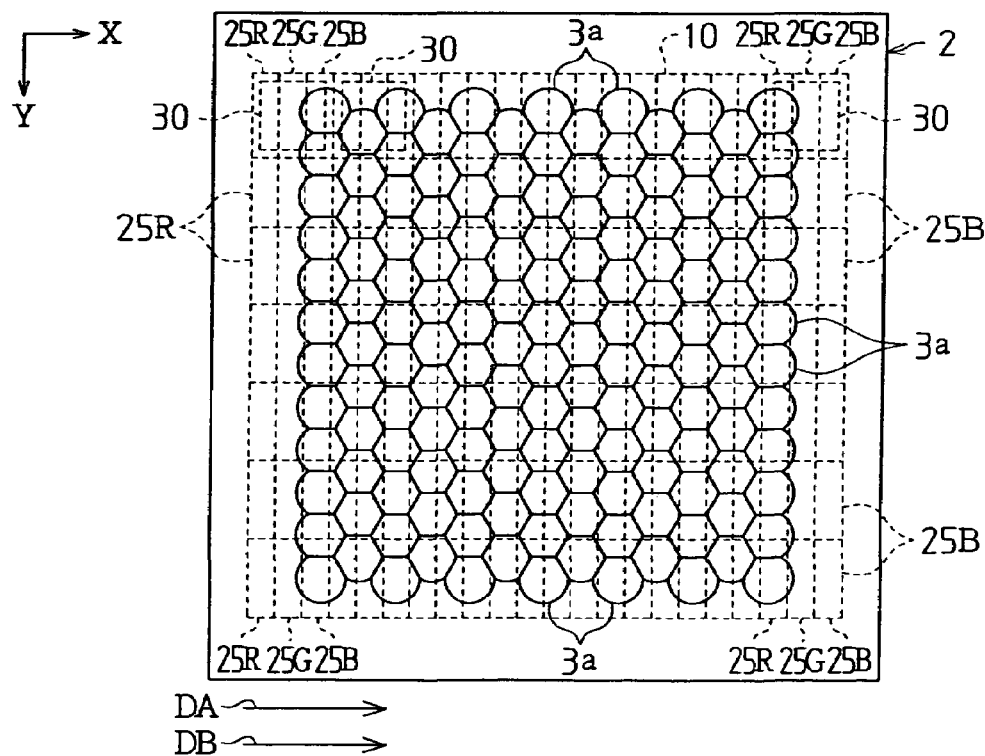
FIG. 18 is a plan view of the erecting-unmagnifying lens module overlapped with the display.

The display device 10 has a lateral direction (the direction DA in FIG. 18). The pixels 30 form lines that extend in the DA direction. The erecting-unmagnifying lens module 2 has a lateral direction (the direction DB in FIG. 18). The microlenses 3a form lines that extend in a zigzagged manner in the DB direction. The erecting-unmagnifying lens module 2 and the display device 10 are arranged in a manner that an angle θ between the DA direction and DB direction is zero.

As shown in FIG. 13, upper and lower lens fixing stages 61 respectively support the upper and lower ends of the lens array plates 3. Upper and lower moving stages 65 are respectively fixed to upper and lower walls 51c and 51d of the case 51. The upper and lower moving stages 65 support the upper and lower lens fixing stages 61 in a manner enabling movement between the display device 10 and the glass plate 53. The moving stages 65 enable the distance between the lens array plates 3 and the display device 10 and the distance between the lens array plates 3 and the glass plate 53 to be changed.

Direct drive mechanisms are used for the lens fixing stages 61 and the moving stages 65. Examples of direct drive mechanisms include a direct drive screw mechanism. The direct drive screw mechanism includes a screw shaft (drive shaft) attached to the moving stage 65 and extending in the Z-axis direction, a guide groove in which the screw shaft is placed, and a ball nut mated with the screw shaft. The screw shaft is connected to a Z-axis motor such as a step motor. The Z-axis motor produces forward or reverse rotation in accordance with a drive signal related to a predetermined step number. The lens fixing stages 61 are moved relative to the moving stages 65 in the Z-axis direction at a predetermined speed by a predetermined amount in accordance with the rotation produced by the Z-axis motor. The movement of the lens fixing stages 61 changes the distance Lz (refer to FIG. 13) between the erecting-unmagnifying lens module 2 and the image display screen M of the display device 10 within a predetermined range.

Figure 1:
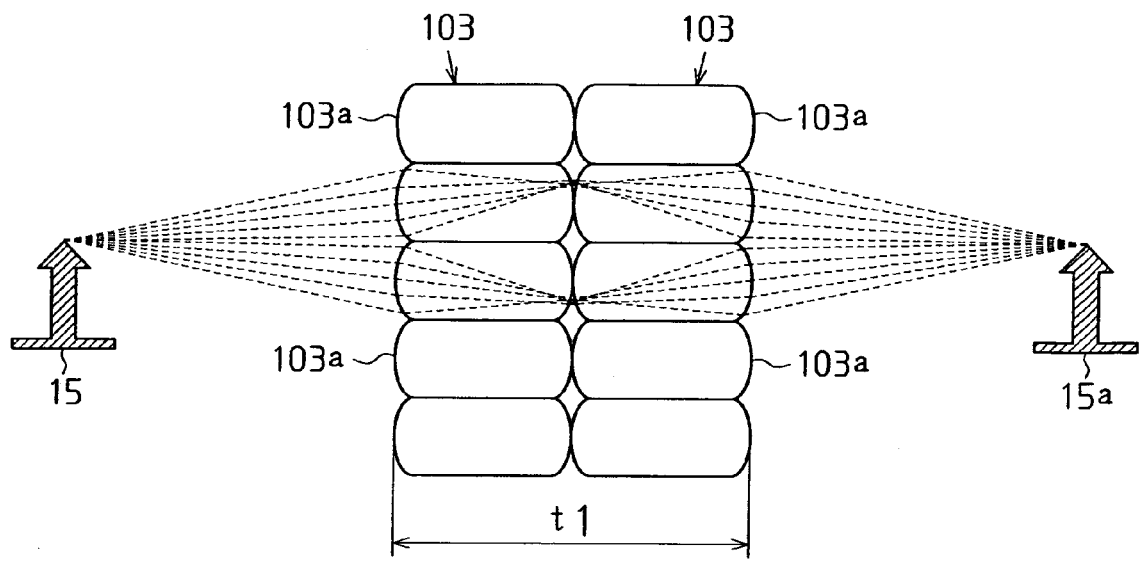
FIG. 1 is a schematic diagram showing image formation using an erecting-unmagnifying lens module in the prior art.

The erecting-unmagnifying lens module 2 will now be described. The lens array plate 3 includes the microlenses 3a each having the desired spherical aberration. The total thickness t of the two lens array plates 3 is smaller than a design thickness value (t1: FIG. 1) that minimizes the spherical aberration of each microlens. The microlenses 3a are formed to have a desired spherical aberration by forming the erecting-unmagnifying lens module 2 to be relatively thin.

Light rays from the object 15 pass through optimum positions in the lens surfaces of the microlenses 3a in accordance with the distance Lz (refer to FIG. 13). As a result, when the inside of the case 51 is viewed by the observer through the window W, the image displayed on the image display screen M of the display device 10 is viewed by the observer as a stereoimage that is floating due to binocular disparity.

Figure 19:
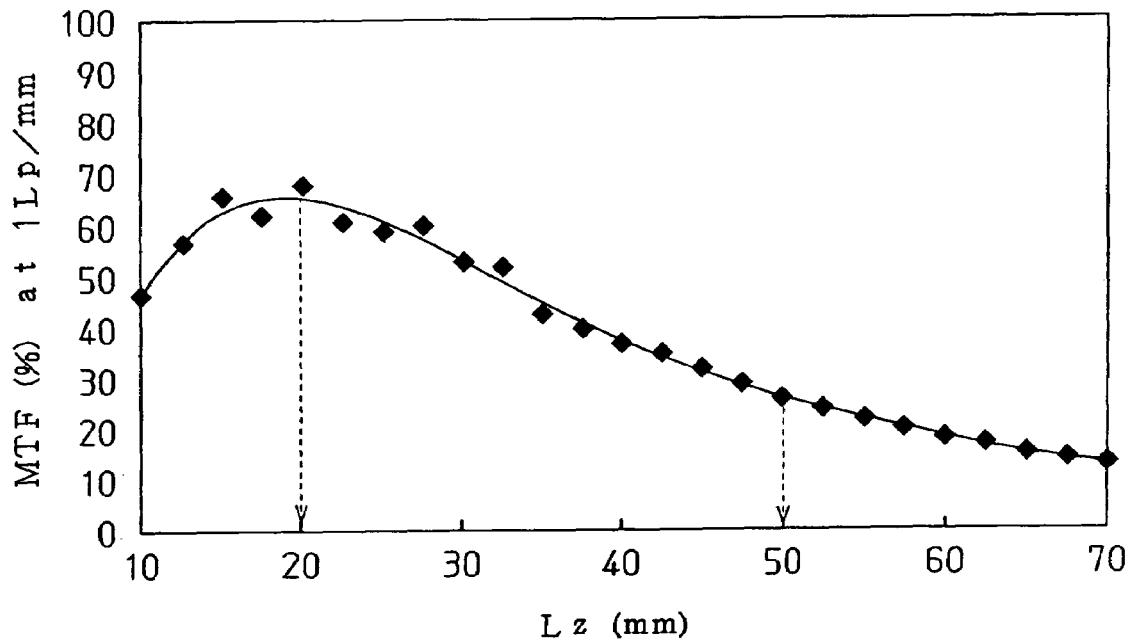
FIG. 19 is a graph showing the distance Lz between the erecting-unmagnifying lens module and the image display screen of the display relative to the resolution of the erecting-unmagnifying lens module.

Experiments have been conducted to confirm that the resolution (MTF) of the erecting-unmagnifying lens module 2 depends on the distance Lz between the erecting-unmagnifying lens module 2 and the image display screen M of the display device 10. FIG. 19 shows the relationship between the resolution (MTF) of the erecting-unmagnifying lens module 2 and the distance Lz.

As shown in FIG. 19, the resolution (MTF) of the erecting-unmagnifying lens module 2 becomes the highest when the distance Lz is about 20 mm. The resolution of the erecting-unmagnifying lens module 2 gradually decreases as the distance Lz increases or decreases from about 20 mm. In the second embodiment, the position at which the erecting-unmagnifying lens module 2 is set on the lens fixing stages 61 and the movable range in which the erecting-unmagnifying lens module 2 may be moved are determined in a manner that the resolution of the erecting-unmagnifying lens module 2 becomes the highest within the movable range when the resolution (MTF) is maintained at a value of at least 10% and the distance Lz between the erecting-unmagnifying lens module 2 and the image display screen M is the minimum value in the movable range. In the example of FIG. 19, the setting positions of the lens fixing stages 61 and the moving stages 65 and the movable range of the erecting-unmagnifying lens module 2 are determined in a manner that the minimum value of the distance Lz between the erecting-unmagnifying lens module 2 and the image display screen M becomes 20 mm.

The second embodiment has the advantages described below.

(1) The erecting-unmagnifying lens module 2 is arranged at a position facing the image display screen M of the display device 10. When the inside of the case 51 is viewed by the observer through the window W, the image displayed on the image display screen M of the display device 10 is viewed as a stereoimage that is floating in the case 51.

(2) The erecting-unmagnifying lens module 2 is arranged on the moving stages 65 with the lens fixing stages 61. This structure enables the distance Lz between the erecting-unmagnifying lens module 2 and the image display screen M of the display device 10 to be changed within a predetermined range. As a result, the resolution of the erecting-unmagnifying lens module is changed within a predetermined range by changing the distance Lz. Further, the position of a stereoimage formed in the case 51 is changed by changing the distance Lz.

(3) The resolution of the erecting-unmagnifying lens module 2 is lowered by increasing the distance Lz between the erecting-unmagnifying lens module 2 and the image display screen M of the display device 10. Although the resolution of the erecting-unmagnifying lens module 2 is lowered, the lowered resolution is at a certain level that enables an image to be viewed without blurriness by human eyes. With this structure, even if moire fringes are generated, the lowered resolution of the erecting-unmagnifying lens module 2 reduces the moire fringes. Such light moire fringes are less noticeable. As a result, a high-quality stereoimage in which moire fringes are not substantially observed by the observer is displayed.

(4) The erecting-unmagnifying lens module 2 is arranged in a manner that the resolution (MTF) of the erecting-unmagnifying lens module 2 is maintained at a value of at least 10% and the resolution of the erecting-unmagnifying lens module 2 is the highest within the movable range when the distance Lz between the erecting-unmagnifying lens module 2 and the image display screen M is the smallest within the movable range. As a result, the resolution of the erecting-unmagnifying lens module 2 is changed within a range in which the resolution MTF at 1 lp/mm is 10% or greater by changing the distance between the image display screen M and the erecting-unmagnifying lens module 2. As a result, a stereoimage is displayed as an image clear enough to be viewed without blurriness by human eyes throughout the range in which the erecting-unmagnifying lens module 2 is permitted to be moved relative to the image display screen.

(5) The display device 10 has the pixels 30 that are in a vertical stripe arrangement. The erecting-unmagnifying lens module 2 has the microlenses 3a that are in a hexagonal arrangement. The erecting-unmagnifying lens module 2 having the microlenses 3a that are in a hexagonal arrangement forms a stereoimage of an image that is displayed by the display device 10 having the pixels 30 that are in a vertical stripe arrangement, and moire fringes generated in the stereoimage formed by the erecting-unmagnifying lens module 2 are reduced.

(6) Each pixel 30 includes the sub-pixels 25R, 25G, and 25B of the three colors that are arranged at fixed intervals on the glass substrate 25. The sub-pixels 25R, 25G, and 25B of the same colors are arranged in the vertical direction of the glass substrate 25 to form lines. This structure enables a known full color LCD to be used as the display device 10, and enables the stereoimage formation apparatus 50 to be manufactured at a low cost.

A stereoimage formation apparatus 50 according to a third embodiment of the present invention will now be described with reference to FIG. 20. The third embodiment differs from the second embodiment in that microlenses 3a of an erecting-unmagnifying lens module 2 included in the stereoimage formation apparatus 50 are arranged with a correction lens pitch PLo.

In the example of FIG. 19, the resolution (MTF) of the erecting-unmagnifying lens module 2 is the highest when the distance Lz between the erecting-unmagnifying lens module 2 and the image display screen M is the smallest within the movable range. In this state, moire fringes generated in a stereoimage are most noticeable to human eyes. In the third embodiment, the erecting-unmagnifying lens module 2 has a lens pitch PLo that is corrected based on the ratio of the distance LA between the viewpoint of the observer and the image display screen M of the display device 10 and the distance Lz between the erecting-unmagnifying lens module 2 and the image display screen M.

Figure 20:
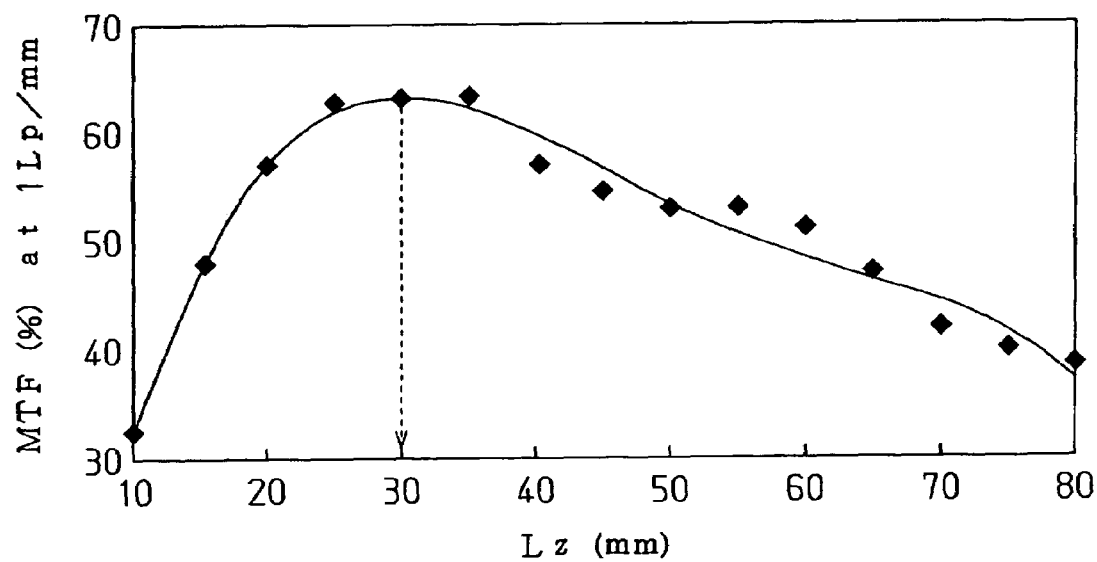
FIG. 20 is an explanatory diagram for a stereoimage formation apparatus according to a third embodiment of the present invention.
Figure 21:
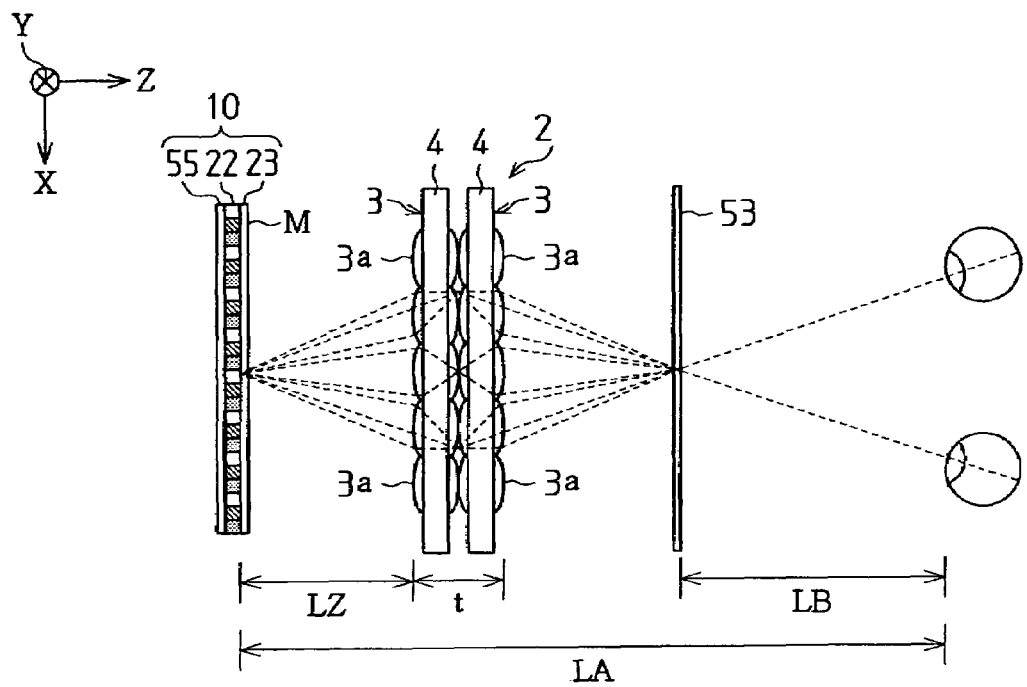
FIG. 21 is an explanatory diagram for a stereoimage formation apparatus according to a fourth embodiment of the present invention.

In the example of FIG. 20, when the distance Lz between the erecting-unmagnifying lens module 2 and the image display screen M is the smallest within the movable range, the ratio of the correction lens pitch PL to the lens pitch PL of the erecting-unmagnifying lens module 2 (PLo/PD) satisfies the expression:

$$(1.20+n*1.50) \leq PLo/PD \leq (1.70+n*1.50),$$

where n=0, 1, 2, 3, . . .

The correction lens pitch PLo is expressed by the expression:

$$PLo=PL/a.$$

The constant a is defined by the expression:

$$a=\{LA-(L+Z/2)\}/\{LA-(2L+Z)\}.$$

The correction lens pitch PLo is set in a manner that the ratio PLo/PD satisfies the above expression when the distance Lz between the image display screen M and the erecting-unmagnifying lens module 2 is the smallest. Setting the correction lens pitch PLo in this way sufficiently reduces the intervals of moire fringes generated in a stereoimage.

The third embodiment has the advantages described below.

The lens pitch PL of the erecting-unmagnifying lens module 2 is corrected based on the ratio of the distance LA between the viewpoint of the observer and the image display screen M of the display device 10 and the distance Lz between the erecting-unmagnifying lens module 2 and the image display screen M. This correction sufficiently reduces the intervals of moire fringes generated in a stereoimage. Such moire fringes are less noticeable. As a result, the stereoimage formation apparatus displays a high-quality stereoimage throughout the range in which the distance Lz between the image display screen M and the erecting-unmagnifying lens module 2 is changeable.

Examples of the third embodiment will now be described.

EXAMPLE 5

Table 1 shows the resolution and the stereoimage quality of a stereoimage formation apparatus 50 of example 5.

TABLE 1

| LA (mm) | 500 | 500 | 500 |
|---|---|---|---|
| PD (mm) | 0.321 | 0.321 | 0.321 |
| Lz (mm) | 20 | 45 | 70 |
| PL (mm) | 0.499 | 0.499 | 0.499 |
| PLo (mm) | 0.476 | 0.448 | 0.415 |
| Resolution (%) | 65 | 60 | 12 |
| PLo/PD | 1.48 | 1.39 | 1.29 |
| angle θ | 0 | 0 | 0 |
| Quality | ◎ | ◎ | ◎ |

In example 5, a full color LCD (99 mm*132 mm) having a diagonal screen size of 6.5 inches and a pixel pitch PD of 0.321 mm*0.321 mm (sub-pixel pitch q of 0.321 mm*0.107 mm) and having a vertical stripe arrangement in which pixels of the same colors are continuously arranged in the vertical direction was used as the display device 10. In example 5, the erecting-unmagnifying lens module 2 has a diagonal screen size of 6.5 inches, and includes the microlenses 3a having a focusing distance of 20 mm, a lens thickness t of 1.66 mm, and a lens pitch PL of 0.499 mm. Each microlens 3a was hexagonal. The microlenses 3a were in a hexagonal arrangement.

When the distance LA between the observer and the image display screen M of the display device 10 is 500 mm and the distance Lz between the image display screen M and the erecting-unmagnifying lens module 2 is 20 mm, the correction lens pitch PLo is 0.476 mm. In this case, the ratio of the correction lens pitch PLo and the pixel pitch PD of the display device 10 is 1.48. Further, the resolution is 65%. In this case, moire fringes are not observable in the stereoimage by the naked eye.

When the distance Lz between the image display screen M and the erecting-unmagnifying lens module 2 is changed to 45 mm, the correction lens pitch PLo becomes 0.448 mm. In this case, the ratio of the correction lens pitch PLo and the pixel pitch PD of the display device 10 becomes 1.39. Further, the resolution becomes 30%. In this case, moire fringes are not observable in the stereoimage by the naked eye.

When the distance Lz between the image display screen M and the erecting-unmagnifying lens module 2 is changed to 70 mm, the correction lens pitch PLo becomes 0.415 mm. In this case, the ratio of the correction lens pitch PLo and the pixel pitch PD of the display device 10 becomes 1.29. Further, the resolution becomes 12%. In this case, moire fringes are not observable in the stereoimage formed in the case 51 by the naked eye.

COMPARATIVE EXAMPLE

Table 2 shows the resolution and the stereoimage quality of a stereoimage formation apparatus in a comparative example.

TABLE 2

| LA (mm) | 500 | 500 | 500 | 500 |
|---|---|---|---|---|
| PD (mm) | 0.255 | 0.255 | 0.255 | 0.255 |
| Lz (mm) | 20 | 40 | 60 | 80 |
| PL (mm) | 0.499 | 0.499 | 0.499 | 0.499 |
| PLo (mm) | 0.476 | 0.454 | 0.429 | 0.402 |
| Resolution (%) | 65 | 38 | 19 | 11 |
| PLo/PD | 1.87 | 1.68 | 1.68 | 1.58 |
| angle θ | 0 | 0 | 0 | 0 |
| Quality | X | X | X | X |

In the comparative example, a full color LCD (229 mm*305 mm) having a diagonal screen size of 15 inches and a pixel pitch PD of 0.255 mm*0.255 mm (sub-pixel pitch q of 0.255 mm*0.099 mm) and having a vertical stripe arrangement in which pixels of the same colors are continuously arranged in the vertical direction was used as the display device 10. In the comparative example, the erecting-unmagnifying lens module 2 used in example 5 was used.

When the distance LA between the observer and the image display screen M of the display device 10 is 500 mm and the distance Lz between the image display screen M and the erecting-unmagnifying lens module 2 is 20 mm, the correction lens pitch PLo is 0.476 mm. In this case, the ratio of the correction lens pitch PLo and the pixel pitch PD of the display device 10 becomes 1.87. Further, the resolution becomes 65%. In this case, moire fringes are clearly observable in a stereoimage formed in the case 51.

When the distance Lz between the image display screen M and the erecting-unmagnifying lens module 2 is changed to 40 mm, the correction lens pitch PLo becomes 0.454 mm. In this case, the ratio of the correction lens pitch PLo and the pixel pitch PD of the display device 10 becomes 1.68. Further, the resolution becomes 38%. In this case, moire fringes are clearly observable in a stereoimage formed in the case 51.

When the distance Lz between the image display screen M and the erecting-unmagnifying lens module 2 is changed to 60 mm, the correction lens pitch PLo becomes 0.429 mm.

In this case, the ratio of the correction lens pitch PLo and the pixel pitch PD of the display device 10 becomes 1.68. Further, the resolution becomes 19%. In this case, moire fringes are clearly observable in a stereoimage formed in the case 51.

Further, when the distance Lz between the image display screen M and the erecting-unmagnifying lens module 2 is changed to 80 mm, the correction lens pitch PLo becomes 0.402 mm. In this case, the ratio of the correction lens pitch PLo and the pixel pitch PD of the display device 10 becomes 1.58. Further, the resolution becomes 11%. In this case, although moire fringes are generated in a stereoimage formed in the case 51, the moire fringes are extremely small and cannot be observed by the naked eye.

EXAMPLE 6

Table 3 shows the resolution and the stereoimage quality of a stereoimage formation apparatus 50 of example 6.

TABLE 3

| LA (mm) | 500 | 500 | 500 | 500 |
|---|---|---|---|---|
| PD (mm) | 0.297 | 0.297 | 0.297 | 0.297 |
| Lz (mm) | 20 | 40 | 60 | 80 |
| PL (mm) | 0.499 | 0.499 | 0.499 | 0.499 |
| PLo (mm) | 0.476 | 0.454 | 0.429 | 0.402 |

TABLE 3-continued

| Resolution (%) | 65 | 38 | 19 | 11 |
|---|---|---|---|---|
| PLo/PD | 1.6 | 1.53 | 1.44 | 1.35 |
| angle θ | 0 | 0 | 0 | 0 |
| Quality | X | ○ | ⊚ | ⊚ |

In example 6, a full color LCD (305 mm*407 mm) having a diagonal screen size of 20 inches and a pixel pitch PD of 0.297 mm*0.297 mm (sub-pixel pitch q of 0.297 mm*0.085 mm) and having a vertical stripe arrangement in which pixels of the same colors are consecutively arranged in the vertical direction was used as the display device 10. In example 6, the erecting-unmagnifying lens module 2 used in example 5 was used.

When the distance LA between the observer and the image display screen M of the display device 10 is 500 mm and the distance Lz between the image display screen M and the erecting-unmagnifying lens module 2 is 20 mm, the correction lens pitch PLo is 0.476 mm. In this case, the ratio of the correction lens pitch PLo and the pixel pitch PD of the display device 10 becomes 1.60. Further, the resolution becomes 65%. In this case, moire fringes are clearly observable in a stereoimage formed in the case 51.

When the distance Lz between the image display screen M and the erecting-unmagnifying lens module 2 is changed to 40 mm, the correction lens pitch PLo becomes 0.454 mm. In this case, the ratio of the correction lens pitch PLo and the pixel pitch PD of the display device 10 becomes 1.53.

Further, the resolution becomes 38%. In this case, although moire fringes are generated in a stereoimage formed in the case 51, the moire fringes are extremely small and cannot be observed by the naked eye.

When the distance Lz between the image display screen M and the erecting-unmagnifying lens module 2 is changed to 60 mm, the correction lens pitch PLo becomes 0.429 mm. In this case, the ratio of the correction lens pitch PLo and the pixel pitch PD of the display device 10 becomes 1.44. Further, the resolution becomes 19%. In this case, moire fringes are not observable by the naked eye in a stereoimage formed in the case 51.

Further, when the distance Lz between the image display screen M and the erecting-unmagnifying lens module 2 is changed to 80 mm, the correction lens pitch PLo becomes 0.402 mm. In this case, the ratio of the correction lens pitch PLo and the pixel pitch PD of the display device 10 becomes 1.35. Further, the resolution becomes 11%. In this case, moire fringes are not observable by the naked eye in a stereoimage formed in the case 51.

Tables 4 and 5 show the resolution and the stereoimage quality of a stereoimage formation apparatus 50 of example 7.

TABLE 4

| Lz (mm) | 30 | 30 | 30 | 30 | 30 | 30 | 30 | 30 | 30 |
|---|---|---|---|---|---|---|---|---|---|
| LA (mm) | 500 | 500 | 500 | 500 | 500 | 500 | 500 | 500 | 500 |
| PD (mm) | 0.297 | 0.297 | 0.255 | 0.321 | 0.255 | 0.297 | 0.297 | 0.255 | 0.255 |
| PL (mm) | 0.38 | 0.41 | 0.38 | 0.499 | 0.41 | 0.499 | 0.55 | 0.499 | 0.55 |
| PLo/PD | 1.19 | 1.29 | 1.39 | 1.45 | 1.5 | 1.57 | 1.73 | 1.82 | 2.01 |
| Quality | X | ○ | ⊚ | ⊚ | ⊚ | ○ | X | X | X |

TABLE 5

| Lz (mm) | 30 | 30 | 30 | 30 | 30 | 30 |
|---|---|---|---|---|---|---|
| LA (mm) | 500 | 500 | 500 | 500 | 500 | 500 |
| PD (mm) | 0.297 | 0.264 | 0.264 | 0.255 | 0.255 | 0.255 |
| PL (mm) | 0.85 | 0.8 | 0.85 | 0.85 | 0.9 | 0.95 |
| PLo/PD | 2.67 | 2.83 | 3 | 3.11 | 3.29 | 3.47 |
| Quality | X | ○ | ⊚ | ○ | ○ | X |

In example 7, the resolution (MTF) of the erecting-unmagnifying lens module 2 and the distance Lz have the relationship shown in FIG. 20. More specifically, the resolution (MTF) of the erecting-unmagnifying lens module 2 is the highest when the distance Lz is about 30 mm, and gradually decreases as the distance Lz increases or decreases from approximately 30 mm.

As shown in Tables 4 and 5, when the distance LA between the observer and the image display screen M of the display device 10 is 500 mm and the distance Lz between the image display screen M and the erecting-unmagnifying lens module 2 is 30 mm, the ratio of the correction lens pitch PLo and the pixel pitch PD of the display device 10 is set at 1.19 by setting the pixel pitch PD at 0.297 mm and the lens pitch PL at 0.38 mm. In this case, moire fringes are clearly observable in a stereoimage formed in the case 51.

The ratio of the correction lens pitch PLo and the pixel pitch PD of the display device 10 is set at 1.29 by setting the pixel pitch PD at 0.297 mm and the lens pitch PL at 0.41 mm. In this case, although moire fringes are generated in a stereoimage formed in the case 51, the moire fringes are extremely small and cannot be observed by the naked eye.

The ratio of the correction lens pitch PLo and the pixel pitch PD of the display device 10 is set at 1.39 by setting the pixel pitch PD at 0.255 mm and the lens pitch PL at 0.38 mm. In this case, moire fringes are not observable by the naked eye in a stereoimage formed in the case 51.

The ratio of the correction lens pitch PLo and the pixel pitch PD of the display device 10 is set at 1.45 by setting the pixel pitch PD at 0.321 mm and the lens pitch PL at 0.499 mm. In this case, moire fringes are not observable by the naked eye in a stereoimage formed in the case 51.

The ratio of the correction lens pitch PLo and the pixel pitch PD of the display device 10 is set at 1.50 by setting the pixel pitch PD at 0.255 mm and the lens pitch PL at 0.41 mm. In this case, although moire fringes are generated in a stereoimage formed in the case 51, the moire fringes are extremely small and cannot be observed by the naked eye.

The ratio of the correction lens pitch PLo and the pixel pitch PD of the display device 10 is set at 1.73 by setting the pixel pitch PD at 0.297 mm and the lens pitch PL at 0.55 mm. In this case, moire fringes are clearly observable in a stereoimage formed in the case 51.

The ratio of the correction lens pitch PLo and the pixel pitch PD of the display device 10 is set at 1.82 by setting the pixel pitch PD at 0.255 mm and the lens pitch PL at 0.499 mm. In this case, moire fringes are clearly observable in a stereoimage formed in the case 51.

The ratio of the correction lens pitch PLo and the pixel pitch PD of the display device 10 is set at 2.01 by setting the pixel pitch PD at 0.255 mm and the lens pitch PL at 0.55 mm. In this case, moire fringes are clearly observable in a stereoimage formed in the case 51.

The ratio of the correction lens pitch PLo and the pixel pitch PD of the display device 10 is set at 2.67 by setting the pixel pitch PD at 0.297 mm and the lens pitch PL at 0.85 mm. In this case, moire fringes are clearly observable in a stereoimage formed in the case 51.

The ratio of the correction lens pitch PLo and the pixel pitch PD of the display device 10 is set at 2.83 by setting the pixel pitch PD at 0.264 mm and the lens pitch PL at 0.8 mm. In this case, although moire fringes are generated in a stereoimage formed in the case 51, the moire fringes are extremely small and cannot be observed by the naked eye.

The ratio of the correction lens pitch PLo and the pixel pitch PD of the display device 10 is set at 3.00 by setting the pixel pitch PD at 0.264 mm and the lens pitch PL at 0.85 mm. In this case, moire fringes are not observable in a stereoimage formed in the case 51.

The ratio of the correction lens pitch PLo and the pixel pitch PD of the display device 10 is set at 3.11 by setting the pixel pitch PD at 0.255 mm and the lens pitch PL at 0.85 mm. In this case, although moire fringes are generated in a stereoimage formed in the case 51, the moire fringes are extremely small and cannot be observed by the naked eye.

The ratio of the correction lens pitch PLo and the pixel pitch PD of the display device 10 is set at 3.29 by setting the pixel pitch PD at 0.255 mm and the lens pitch PL at 0.9 mm. In this case, although moire fringes are generated in a stereoimage formed in the case 51, the moire fringes are extremely small and cannot be observed by the naked eye.

The ratio of the correction lens pitch PLo and the pixel pitch PD of the display device 10 is set at 3.47 by setting the pixel pitch PD at 0.255 mm and the lens pitch PL at 0.95 mm. In this case, moire fringes are clearly observable in a stereoimage formed in the case 51.

In Tables 1 to 5, the double-circle mark indicates that the image has maximum quality and no moire fringes are generated in the image, the single-circle mark indicates that the image has high quality and moire fringes generated in the image are extremely small and cannot be observed by the naked eye, and the crossed-mark indicates that the image has low quality and moire fringes generated in the image are clearly observed.

A stereoimage formation apparatus 50 according to a fourth embodiment of the present invention will now be described with reference to FIG. 22. The fourth embodiment differs from the second embodiment only in the arrangement of the erecting-unmagnifying lens module 2 and the display device 10.

Figure 22:
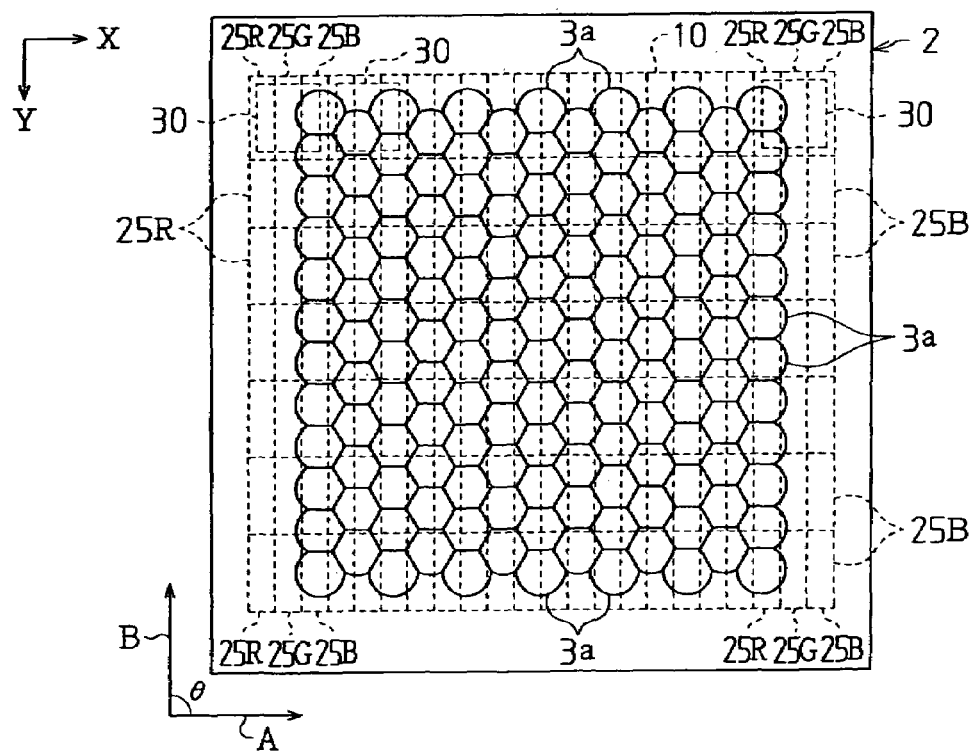
FIGS. 22 to 27 are plan views showing modifications of the present invention.

As shown in FIG. 22, the lateral direction (DA) of the display device 10 is inclined relative to the lateral direction (DB) of the erecting-unmagnifying lens module 2. The angle $\theta$ between the arrows DA and DB is 90 degrees.

With the angle $\theta$ being 90 degrees, the arrangement pattern of the pixels 30 of the display device 10 (LCD) and the arrangement pattern of the microlenses 3a of the erecting-unmagnifying lens module 2 do not interfere with each other.

Inclination of the erecting-unmagnifying lens module 2 corrects the correction lens pitch PLo by a greater amount. The second correction lens pitch PLoa is determined to satisfy the expression:

$$(1.20+n*1.50) \leq PLoa/PD \leq (1.70+n*1.50),$$

where n=0, 1, 2, 3, . . . .

The second correction lens pitch PLoa and the correction lens pitch PLo satisfy the expressions:

$$PLoa(x) = \cos\theta * PLo(x), \text{ and}$$

$$PLoa(y) = PLo(y)/\cos\theta.$$

The correction lens pitch PLo(x) is the correction lens pitch in the X-axis direction, and the correction lens pitch PLo(y) is a correction lens pitch in the Y-axis direction.

When the erecting-unmagnifying lens module 2 has a hexagonal arrangement of pixels, PLo(x) and PLo(y) satisfy the expression:

$$PLo(y) = \sqrt{2} * PLo(x)/3,$$

where $-30° \leq \theta - (60°*n) \leq 30°$; n is an integer.

When the erecting-unmagnifying lens module 2 has a square arrangement of pixels, PLo(x) and PLo(y) satisfy the expression:

$$PLo(y) = PLo(x),$$

where $-45° \leq \theta - (90°*n) \leq 45°$; n is an integer.

The fourth embodiment has the advantages described below.

The angle $\theta$ between the lateral direction (DA) of the display device 10 and the lateral direction (DB) of the erecting-unmagnifying lens module 2 is 90 degrees. In this case, the sides of the arrangement pattern of the microlenses 3a do not extend in the same direction as the sides of the arrangement pattern of the pixels 30. The arrangement pattern of the pixels 30 of the display device 10 and the arrangement pattern of the microlenses 3a of the erecting-unmagnifying lens module 2 do not interfere with each other. This structure more reliably reduces moire fringes, and enables the display of a stereoimage having a higher-quality.

In the fourth embodiment, the angle θ between the lateral direction (DA) of the display device 10 and the lateral direction (DB) of the erecting-unmagnifying lens module 2 may be an angle that is not 90 degrees. Even in such a case, the sides of the arrangement pattern of the microlenses 3a do not extend in the same direction as the sides of the arrangement pattern of the pixels 30. This structure further reduces moire fringes and enables the display of a stereoimage having higher quality. For example, the erecting-unmagnifying lens module 2 may be inclined with respect to the display device 10 in a manner that the angle θ between the lateral direction of the pixel arrangement of the display device 10 and the lateral direction of the microlens arrangement of the erecting-unmagnifying lens module 2 is 15 degrees. See FIG. 25.

Figure 23:
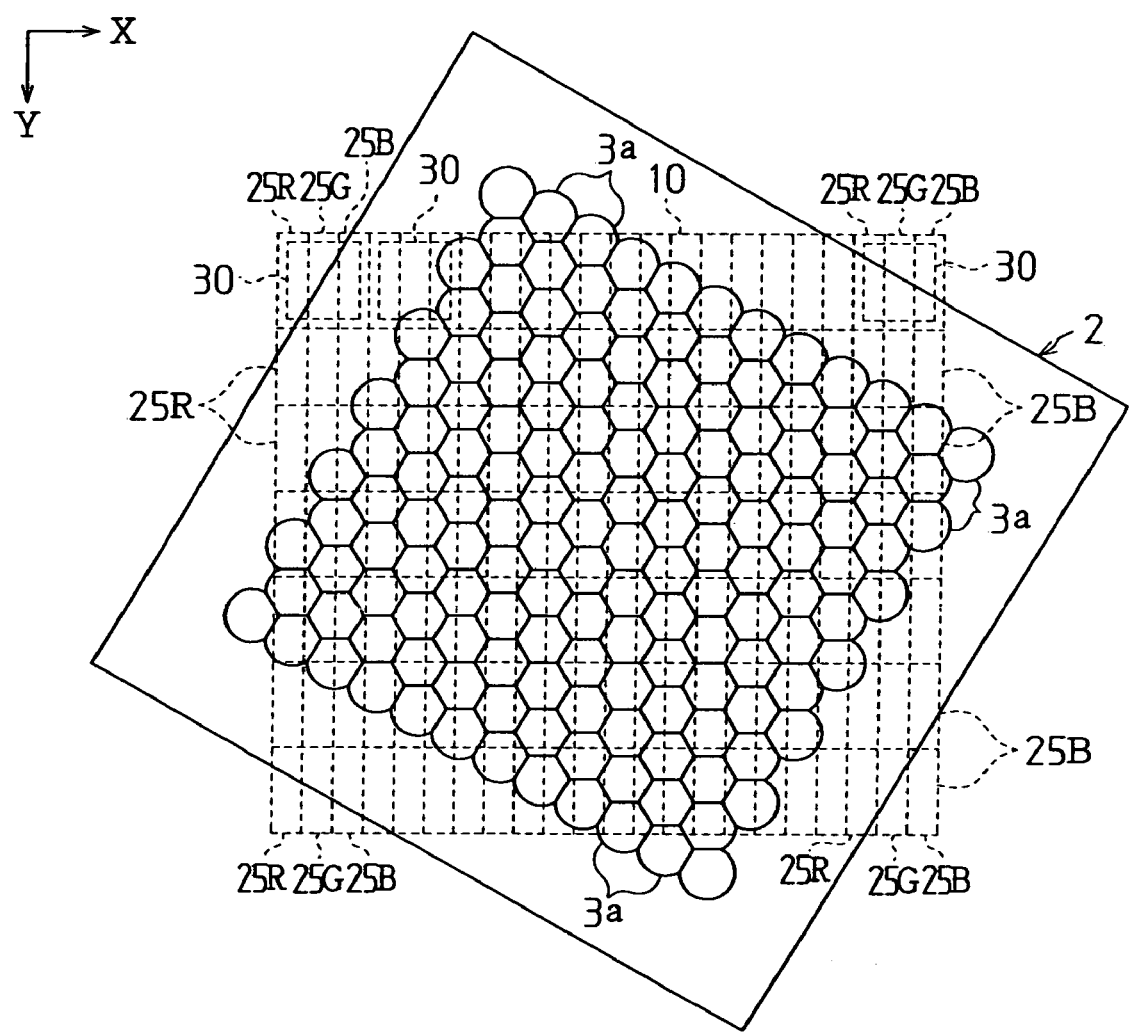
Figure 24:
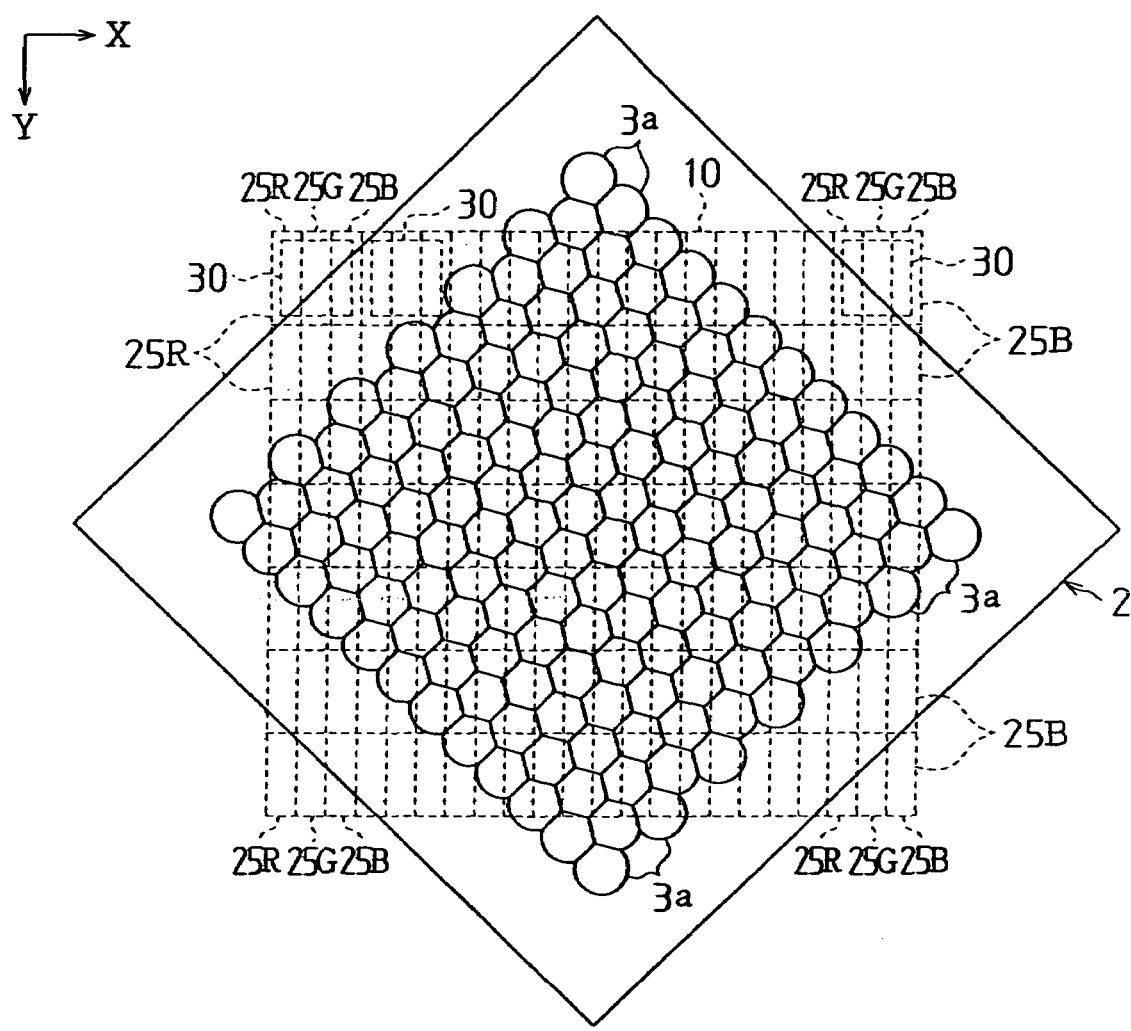
Figure 25:
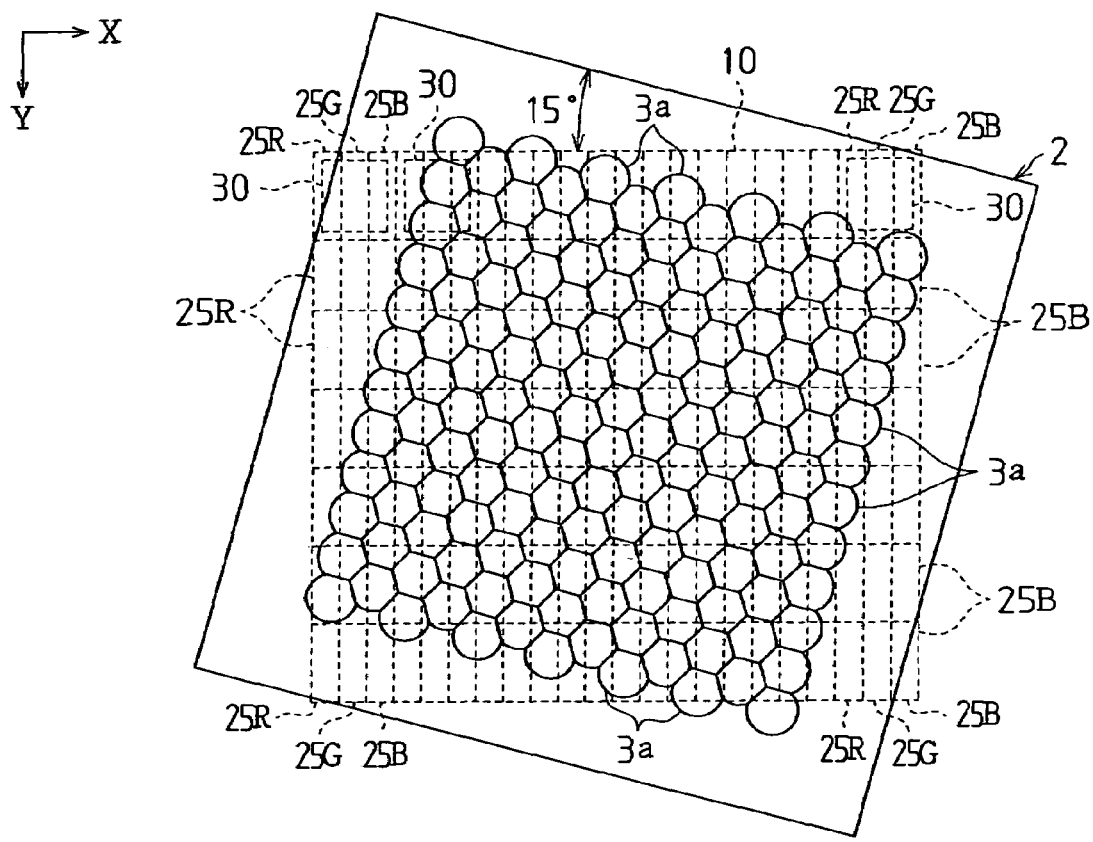

FIGS. 23 to 25 show modifications of the fourth embodiment. In the example of FIG. 25, the angle θ between a side of the erecting-unmagnifying lens module 2 and a side of the display device 10 is 5 degrees. Tables 6 and 7 show the resolution and the stereoimage quality of the example shown in FIG. 25.

In the example of Table 6, a full color LCD (229 mm*305 mm) having a diagonal screen size of 15 inches and a pixel pitch PD of 0.255 mm*0.255 mm (sub-pixel pitch q of 0.255 mm*0.099 mm) and having a vertical stripe arrangement in which pixels of the same colors are continuously arranged in the vertical direction was used as the display device 10. In the example of Table 6, the erecting-unmagnifying lens module 2 used in example 5 was used.

TABLE 6

| LA (mm) | 500 | 500 | 500 | 500 |
|---|---|---|---|---|
| PD (mm) | 0.255 | 0.255 | 0.255 | 0.255 |
| Lz (mm) | 20 | 40 | 60 | 80 |
| PL (mm) | 0.499 | 0.499 | 0.499 | 0.499 |
| PLo (mm) | 0.476 | 0.454 | 0.429 | 0.402 |
| Resolution (%) | 65 | 38 | 19 | 11 |
| PLo/PD | 1.87 | 1.78 | 1.68 | 1.58 |
| angle θ | 15 | 15 | 15 | 15 |
| Quality | ○ | ○ | ○ | ◎ |

TABLE 7

| LA (mm) | 500 | 500 | 500 | 500 |
|---|---|---|---|---|
| PD (mm) | 0.297 | 0.297 | 0.297 | 0.297 |
| Lz (mm) | 20 | 40 | 60 | 80 |
| PL (mm) | 0.499 | 0.499 | 0.499 | 0.499 |
| PLo (mm) | 0.476 | 0.454 | 0.429 | 0.402 |
| Resolution (%) | 65 | 38 | 19 | 11 |
| PLo/PD | 1.6 | 1.53 | 1.44 | 1.35 |
| angle θ | 15 | 15 | 15 | 15 |
| Quality | ○ | ◎ | ◎ | ◎ |

As shown in Tables 2 and 6, when the distance Lz between the image display screen M and the erecting-unmagnifying lens module 2 is in the range of 20 mm to 60 mm, moire fringes are clearly observable in example 6, whereas moire fringes are extremely small and cannot be observed by the naked eye in the example of Table 6. Further, when the distance Lz is 80 mm, moire fringes are extremely small and cannot be observed by the naked eye in example 6, whereas moire fringes are not generated in the example of Table 6.

In the example of Table 7, a full color LCD (305*407 mm) having a diagonal screen size of 20 inches and a pixel pitch PD of 0.297*0.297 mm (sub-pixel pitch q of 0.297*0.085 mm) and having a vertical stripe arrangement in which pixels of the same colors are continuously arranged in the vertical direction was used as the display device 10. In the example of Table 7, the erecting-unmagnifying lens module 2 used in example 5 was used.

As shown in Tables 3 and 7, when the distance Lz between the image display screen M and the erecting-unmagnifying lens module 2 is 20 mm, moire fringes are clearly observable in example 6, whereas moire fringes generated are extremely small and cannot be observed by the naked eye in the example of Table 7. Further, when the distance Lz is 40 mm, moire fringes are extremely small and cannot be observed by the naked eye in example 6, whereas moire fringes are not generated in the example of Table 7.

It should be apparent to those skilled in the art that the present invention may be embodied in many other specific forms without departing from the spirit or scope of the invention. Particularly, it should be understood that the present invention may be embodied in the following forms.

In the second to fourth embodiments, the red, green, and blue sub-pixels 25R, 25G, and 25B of the three colors for forming the pixels 30 of the display device 10 are in a stripe arrangement in which the sub-pixels 25R, 25G, and 25B of the same colors are arranged in the same direction. However, the present invention should not be limited to this structure. For example, the red, green, and blue sub-pixels 25R, 25G, and 25B may be in a delta arrangement in which the red, green, and blue sub-pixels 25R, 25G, and 25B of the three colors are respectively at the vertexes of triangles.

Figure 26:
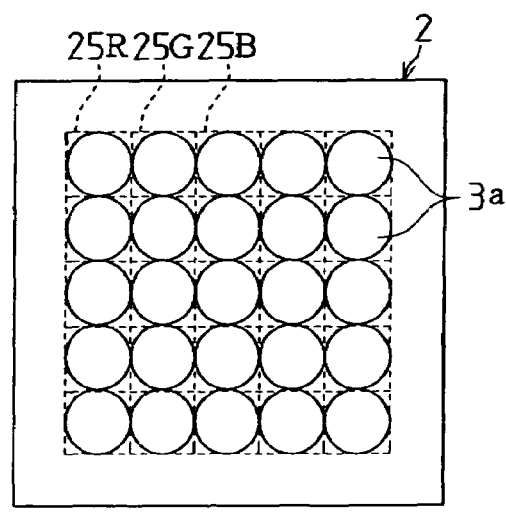

When the display device 10 has the delta arrangement of pixels, the microlenses 3a of the erecting-unmagnifying lens module 2 may be in a square arrangement. FIG. 26 shows the arrangement relationship between the erecting-unmagnifying lens module 2 having the square arrangement of microlenses 3a and the display device 10. In this case, the same advantages as described in the second and third embodiments are obtained.

When the erecting-unmagnifying lens module 2 and the display device 10 have the arrangement relationship shown in FIG. 26, the sides of the conversion layers 28R, 28G, and 28B of the color filter 23 and the Y-axis direction sides of the microlenses 3a that are in a square arrangement extend in the same direction (Y-axis direction). In this case, the arrangement pattern of the pixels 30 of the display device 10 and the arrangement pattern of the microlenses 3a of the erecting-unmagnifying lens module 2 may interfere with each other. Such interference may generate moire fringes.

Figure 27A:
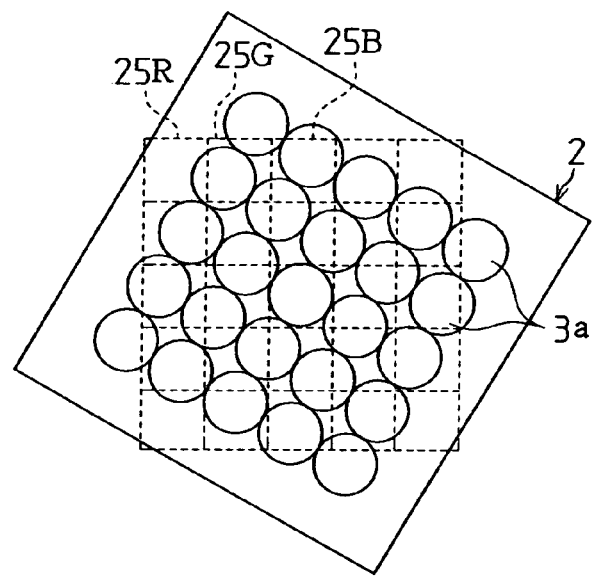
Figure 27B:
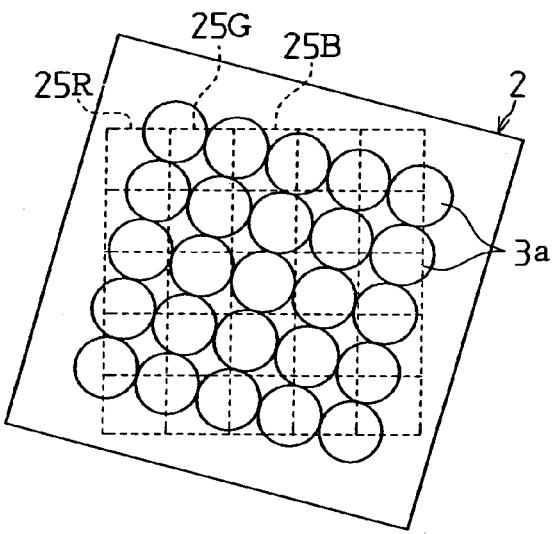
Figure 27C:
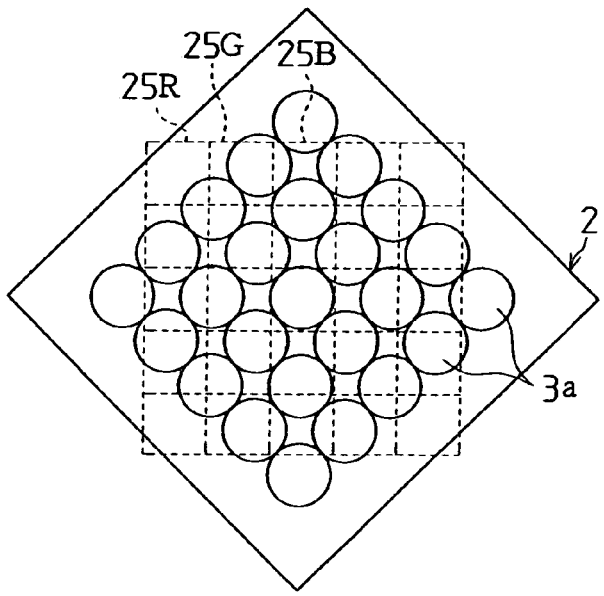

In this case, the erecting-unmagnifying lens module 2 and the display device 10 need to be arranged in a manner such that the sides of the conversion layers 28R, 28G, and 28B of the color filter 23 and the Y-axis direction sides of the microlenses 3a that are in a square arrangement do not extend in the same direction (Y-axis direction) as shown in FIGS. 27A, 27B, and 27C. More specifically, the erecting-unmagnifying lens module 2 and the display device 10 are arranged at an inclination relative to each other at a predetermined angle in a manner that the angle θ between the lateral direction (DA direction in FIG. 26) of the arrangement of the pixels 30 and the lateral direction (DB direction in FIG. 26) of the arrangement of the microlenses 3a is not 0 degrees. In this case, the arrangement pattern of the pixels 30 and the arrangement pattern of the microlenses 3a of the erecting-unmagnifying lens module 2 do not interfere with each other. As a result, the sides of the arrangement pattern of the microlenses 3a do not extend in the same direction as the sides of the arrangement pattern of the pixels 40. This structure reduces moire fringes and enables the display of a stereoimage having a higher quality.

The lens module 2 may be formed by three or more lens array plates 3.

The shape and the arrangement of the microlenses 3a are determined in such a manner that no gap is formed between adjacent microlenses 3a. For example, each lens array plate 3 may have microlenses 3a that are in a square arrangement. Each microlens 3a may be square. However, it is preferable that each outer microlens 3 have the circular periphery 3b.

Each lens array plate 3 may be a flat plate microlens array of microlenses 3a with spherical or non-spherical surfaces arranged on one main surface of the substrate 4.

In the display apparatus 1 (refer to FIGS. 12 and 13), a reflection reducing filter for reducing reflected light may be arranged on the front side (image side) of the lens array plates 3. The reflection reducing filter may be made from any material having a property that reduces reflected light, such as a colored glass plate.

The display device 10 should not be limited to an LCD and may be other displays, such as an organic EL (electroluminescence) display or a plasma display.

The two lens array plates 3 may be spaced from each other if the two lens array plates 3 spaced from each other have optical capabilities equivalent to that of the two lens array plates 3 arranged in contact with each other.

The present examples and embodiments are to be considered as illustrative and not restrictive, and the invention is not to be limited to the details given herein, but may be modified within the scope and equivalence of the appended claims.

What is claimed is:

1. A stereoimage formation apparatus comprising:
at least two lens array plates, each lens array plate including a plurality of microlenses, each having an optical axis and a peak, wherein:
the optical axes of the microlenses are parallel to one another;
the optical axes of the microlenses in one of the at least two lens array plates are aligned with the optical axes of the microlenses in the other one of the at least two lens array plates;
the peaks of the microlenses in one of the at least two lens array plates are in contact with or located proximal to the peaks of the microlenses in the other one of the at least two lens array plates; and
the microlenses of each lens array plate each have a predetermined spherical aberration that is greater than a predetermined minimum spherical aberration by a controlled amount thereby allowing a working distance of the stereoimage formation apparatus to be changed while still providing an image clear enough to be viewed without blurriness.

2. The stereoimage formation apparatus according to claim 1, wherein the microlenses of the at least two lens array plates each have the same lens capability.

3. The stereoimage formation apparatus according to claim 1, wherein the stereoimage formation apparatus has a controlled thickness in a direction of the optical axis, and the controlled thickness is less than a design thickness value that minimizes the spherical aberration of each microlens.

4. The stereoimage formation apparatus according to claim 1, wherein the at least two lens array plates are integrated to form a single erecting-unmagnifying lens module.

5. The stereoimage formation apparatus according to claim 1, wherein:
the stereoimage formation apparatus is an erecting-unmagnifying stereoimage formation apparatus;
when the at least two lens array plates are separated from an object by a front side working distance, a light ray provided from the object passes through a point in the surface of each microlens and the stereoimage formation apparatus forms an image of the object at a rear side working distance that is equal to the front side working distance; and
when the front side working distance is changed, the light ray passes through a different point in the surface of each microlens.

6. A stereoimage formation apparatus comprising:
at least two lens array plates, each lens array plate including a plurality of microlenses, each having an optical axis and a peak, wherein:
the optical axes of the microlenses are parallel to one another;
the optical axes of the microlenses in one of the at least two lens array plates are aligned with the optical axes of the microlenses in the other one of the at least two lens array plates;
the peaks of the microlenses in one of the at least two lens array plates are in contact with or located proximal to the peaks of the microlenses in the other one of the at least two lens array plates; and
the microlenses of each lens array plate each have a predetermined spherical aberration that is greater than a predetermined minimum spherical aberration, wherein each lens array plate has a rear side working distance in the range of 5 to 150 mm, in which resolution is 10% or greater at one line pair/mm and a resolution change rate is greater than 0%/mm and less than or equal to 2%/mm.

7. The stereoimage formation apparatus according to claim 1, wherein each lens array plate includes:
a substrate having two main surfaces; and
a plurality of microlenses having spherical or aspherical surfaces that are arranged on one or both of the two main surfaces of the substrate.

8. The stereoimage formation apparatus according to claim 1, wherein each lens array plate is made of a transparent resin.

9. The stereoimage formation apparatus according to claim 8, wherein each lens array plate has a side edge, the microlenses of each lens array plate are arranged adjacent to one another in a two-dimensional area and include a plurality of outer microlenses that are arranged near the side edge of the lens array plate, and each outer microlens has a circular periphery extending along the side close to the side edge of the lens array plate, the stereoimage formation apparatus further comprising:
a light shielding film, arranged on the at least two lens array plates, for covering the circular peripheries of the outer microlenses.

10. A stereoimage display apparatus comprising:
the stereoimage formation apparatus according to claim 1;
a display subject object; and
a case for accommodating the stereoimage formation apparatus and the display subject object, wherein the case includes an inner chamber for accommodating a homogeneous medium, the stereoimage formation apparatus is arranged between the inner chamber and the display subject object to form an image of the display subject object in the inner chamber of the case.

11. The stereoimage display apparatus according to claim 10, wherein the display subject object is a display device for displaying a two-dimensional image.

12. The stereoimage formation apparatus according to claim 6, wherein each lens array plate includes:
- a substrate having two main surfaces; and
- a plurality of microlenses having spherical or aspherical surfaces that are arranged on one or both of the two main surfaces of the substrate.

13. The stereoimage formation apparatus according to claim 6, wherein each lens array plate is made of a transparent resin.

14. The stereoimage formation apparatus according to claim 13, wherein each lens array plate has a side edge, the microlenses of each lens array plate are arranged adjacent to one another in a two-dimensional area and include a plurality of outer microlenses that are arranged near the side edge of the lens array plate, and each outer microlens has a circular periphery extending along the side close to the side edge of the lens array plate, the stereoimage formation apparatus further comprising:
- a light shielding film, arranged on the at least two lens array plates, for covering the circular peripheries of the outer microlenses.

15. A stereoimage display apparatus comprising:
- the stereoimage formation apparatus according to claim 6;
- a display subject; and
- a case for accommodating the stereoimage formation apparatus and the display subject object, wherein the case includes an inner chamber for accommodating a homogeneous medium, the stereoimage formation apparatus is arranged between the inner chamber and the display subject object to form an image of the display subject object in the inner chamber of the case.

16. The stereoimage display apparatus according to claim 15, wherein the display subject object is a display device for displaying a two-dimensional image.

17. A stereoimage formation apparatus comprising:
- at least two lens array plates each being made of a transparent resin, and each lens array plate including a plurality of microlenses, each having an optical axis and a peak, wherein:
- the optical axes of the microlenses are parallel to one another;
- the optical axes of the microlenses in one of the at least two lens array plates are aligned with the optical axes of the microlenses in the other one of the at least two lens array plates;
- the peaks of the microlenses in one of the at least two lens array plates are in contact with or located proximal to the peaks of the microlenses in the other one of the at least two lens array plates;
- the microlenses of each lens array plate each have a predetermined spherical aberration that is greater than a predetermined minimum spherical aberration; and
- each lens array plate has a side edge, the microlenses of each lens array plate are arranged adjacent to one another in a two-dimensional area and include a plurality of outer microlenses that are arranged near the side edge of the lens array plate, and each outer microlens has a circular periphery extending along the side close to the side edge of the lens array plate,
- the stereoimage formation apparatus further comprising a light shielding film, arranged on the at least two lens array plates, for covering the circular peripheries of the outer microlenses.

* * * * *